United States Patent
Agarwal et al.

(10) Patent No.: US 12,302,250 B2
(45) Date of Patent: *May 13, 2025

(54) MACRO AND MICRO DISCONTINUOUS RECEPTION

(71) Applicant: QUALCOMM Incorporated, San Diego, CA (US)

(72) Inventors: Ravi Agarwal, San Diego, CA (US); Gavin Bernard Horn, La Jolla, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,006

(22) Filed: Mar. 7, 2024

(65) Prior Publication Data

US 2024/0214933 A1     Jun. 27, 2024

Related U.S. Application Data

(63) Continuation of application No. 17/383,400, filed on Jul. 22, 2021, which is a continuation of application
(Continued)

(51) Int. Cl.
*H04W 52/02* (2009.01)
*H04W 72/23* (2023.01)
(Continued)

(52) U.S. Cl.
CPC ... *H04W 52/0229* (2013.01); *H04W 52/0216* (2013.01); *H04W 72/23* (2023.01);
(Continued)

(58) Field of Classification Search
None
See application file for complete search history.

(56) References Cited

U.S. PATENT DOCUMENTS

| 7,813,296 | B2 | 10/2010 | Lindoff et al. |
| 8,144,679 | B2 | 3/2012 | Cai et al. |

(Continued)

FOREIGN PATENT DOCUMENTS

| AU | 2005287985 B2 | 2/2010 |
| CN | 101483446 A | 7/2009 |

(Continued)

OTHER PUBLICATIONS

European Search Report—EP20198912—Search Authority—Berlin—Dec. 16, 2020.

(Continued)

*Primary Examiner* — Walter J Divito

(74) *Attorney, Agent, or Firm* — Holland & Hart LLP

(57) ABSTRACT

Methods, systems, and devices for wireless communication are described. A wireless device may receive a downlink (DL) reception indication during an active duration of a discontinuous reception (DRX) configuration. The DL reception indication may indicate the presence of a reception opportunity following an inactivity interval, as well as the length of the inactivity interval. The wireless device may refrain from DL monitoring during the inactivity interval. In some cases, the wireless device may enter a sleep mode during the inactivity interval and wake up to receive a subsequent transmission during the reception opportunity. In some examples, the wireless device may use the inactivity interval to communicate using a different radio access technology (RAT).

20 Claims, 18 Drawing Sheets

Related U.S. Application Data

No. 16/871,904, filed on May 11, 2020, now Pat. No. 11,076,352, which is a continuation of application No. 15/927,000, filed on Mar. 20, 2018, now Pat. No. 10,652,822, which is a continuation of application No. 15/188,720, filed on Jun. 21, 2016, now Pat. No. 10,524,206.

(60) Provisional application No. 62/265,244, filed on Dec. 9, 2015, provisional application No. 62/265,249, filed on Dec. 9, 2015, provisional application No. 62/265,256, filed on Dec. 9, 2015.

(51) Int. Cl.
   *H04W 76/28* (2018.01)
   *H04W 88/02* (2009.01)
   *H04W 88/06* (2009.01)

(52) U.S. Cl.
   CPC ............ *H04W 76/28* (2018.02); *H04W 88/02* (2013.01); *H04W 88/06* (2013.01); *Y02D 30/70* (2020.08)

(56) References Cited

U.S. PATENT DOCUMENTS

| | | |
|---|---|---|
| 8,165,166 B2 | 4/2012 | Fischer |
| 8,169,957 B2 | 5/2012 | Damnjanovic |
| 8,265,682 B2 | 9/2012 | Bertrand et al. |
| 8,725,145 B2 | 5/2014 | Mutya et al. |
| 9,204,389 B2 | 12/2015 | Gódor et al. |
| 9,225,759 B2 | 12/2015 | Vannithamby et al. |
| 9,351,250 B2 | 5/2016 | Jafarian et al. |
| 9,374,845 B2 | 6/2016 | Xu et al. |
| 10,349,466 B2 | 7/2019 | Agarwal et al. |
| 10,524,206 B2 | 12/2019 | Agarwal et al. |
| 10,652,822 B2 | 5/2020 | Agarwal et al. |
| 11,076,352 B2 | 7/2021 | Agarwal et al. |
| 11,129,185 B2 | 9/2021 | Agarwal et al. |
| 2007/0189205 A1 | 8/2007 | Terry et al. |
| 2008/0279139 A1 | 11/2008 | Beziot et al. |
| 2009/0073907 A1 | 3/2009 | Cai |
| 2009/0180414 A1 | 7/2009 | Maeda et al. |
| 2011/0003555 A1 | 1/2011 | Guo |
| 2011/0128925 A1 | 6/2011 | Lindoff et al. |
| 2011/0274074 A1 | 11/2011 | Lee et al. |
| 2012/0172081 A1 | 7/2012 | Love et al. |
| 2013/0201892 A1 | 8/2013 | Holma et al. |
| 2013/0258919 A1 | 10/2013 | Damnjanovic |
| 2013/0272181 A1 | 10/2013 | Fong et al. |
| 2014/0003314 A1 | 1/2014 | Shu et al. |
| 2014/0071873 A1 | 3/2014 | Wang et al. |
| 2014/0198665 A1 | 7/2014 | Cai |
| 2014/0254452 A1 | 9/2014 | Golitschek Edler Von Elbwart et al. |
| 2014/0254538 A1 | 9/2014 | Park et al. |
| 2014/0269480 A1 | 9/2014 | Han |
| 2014/0301261 A1 | 10/2014 | Godor et al. |
| 2015/0078238 A1 | 3/2015 | Cai |
| 2015/0078307 A1 | 3/2015 | Ohta et al. |
| 2015/0110093 A1 | 4/2015 | Asterjadhi et al. |
| 2015/0117289 A1 | 4/2015 | Voigt et al. |
| 2015/0124674 A1 | 5/2015 | Jamadagni et al. |
| 2015/0223228 A1 | 8/2015 | Rune et al. |
| 2015/0230112 A1 | 8/2015 | Siomina et al. |
| 2015/0282198 A1 | 10/2015 | Wang et al. |
| 2016/0037578 A1 | 2/2016 | Shah et al. |
| 2016/0080133 A1 | 3/2016 | Golitschek Edler Von Elbwart et al. |
| 2016/0088681 A1 | 3/2016 | Chang et al. |
| 2016/0157164 A1 | 6/2016 | Lee et al. |
| 2016/0294531 A1 | 10/2016 | Loehr et al. |
| 2017/0171818 A1 | 6/2017 | Agarwal et al. |
| 2017/0171907 A1 | 6/2017 | Agarwal et al. |
| 2017/0171908 A1 | 6/2017 | Agarwal et al. |
| 2017/0250786 A1 | 8/2017 | Better et al. |
| 2017/0332288 A1 | 11/2017 | Sadek et al. |
| 2017/0367003 A1 | 12/2017 | Zhang et al. |
| 2018/0035329 A1 | 2/2018 | Futaki |
| 2018/0220371 A1 | 8/2018 | Agarwal et al. |
| 2020/0336983 A1 | 10/2020 | Agarwal et al. |
| 2021/0377862 A1 | 12/2021 | Agarwal et al. |
| 2022/0070917 A1 | 3/2022 | Agarwal et al. |

FOREIGN PATENT DOCUMENTS

| | | |
|---|---|---|
| CN | 1732698 B | 10/2012 |
| CN | 103139920 A | 6/2013 |
| CN | 104205993 A | 12/2014 |
| CN | 104396300 A | 3/2015 |
| CN | 108370602 A | 8/2018 |
| EP | 2410804 A1 | 1/2012 |
| EP | 2688347 A1 | 1/2014 |
| EP | 2704513 A1 | 3/2014 |
| EP | 2785112 A1 | 10/2014 |
| EP | 2876969 A3 | 9/2015 |
| KR | 20090116783 A | 11/2009 |
| KR | 20140107596 A | 9/2014 |
| WO | 2008035905 A1 | 3/2008 |
| WO | 2008151407 A1 | 12/2008 |
| WO | 2009033253 A1 | 3/2009 |
| WO | 2009120124 A1 | 10/2009 |
| WO | 2010013960 A2 | 2/2010 |
| WO | 2012103034 A1 | 8/2012 |
| WO | 2013009110 A2 | 1/2013 |
| WO | 2013173814 A1 | 11/2013 |
| WO | 2014121016 | 8/2014 |
| WO | 2014174877 A1 | 10/2014 |
| WO | 2015116866 A1 | 8/2015 |
| WO | 2017100090 A1 | 6/2017 |

OTHER PUBLICATIONS

Huawei et al: "On the relationship between re-tuning timeand bandwidth reduction", 3GPP Draft; R1-143710, 3rd Generation PartnershipProject (3GPP), Mobile Competence Centre; 650, Route Des Lucioles; F-06921Sophia-Antipolis Cedex; France vol. RAN WG1, No. Ljubljana, Slovenia: Oct. 6, 2014-Oct. 10, 2014 Sep. 27, 2014 (Sep. 27, 2014), XP050869396, 5 pages.
International Preliminary Report on Patentability—PCT/US2016/064589, The International Bureau of WIPO—Geneva, Switzerland, Feb. 12, 2018.
International Preliminary Report on Patentability—PCT/US2016/064595, The International Bureau of WIPO—Geneva, Switzerland, Feb. 12, 2018.
International Preliminary Report on Patentability—PCT/US2016/064695, The International Bureau of WIPO—Geneva, Switzerland, Feb. 12, 2018.
International Search Report and Written Opinion—PCT/US2016/064589—ISA/EPO—Apr. 21, 2017.
International Search Report and Written Opinion—PCT/US2016/064595—ISA/EPO—Apr. 21, 2017.
International Search Report and Written Opinion—PCT/US2016/064695—ISA/EPO—Apr. 21, 2017.
Lin D., et al., "Uplink Contention Based Multiple Access for5G Cellular IoT," IEEE 82nd Vehicular Technology Conference (VTCFall), 2015, pp. 1-5.
Nokia: "Active Mode DRX", 3GPP TSG-RANWG2 Meeting #55, R2-062752, Oct. 9-13, 2006. Seoul. Korea, XP002463499, 3 Pages, the Whole Document.
Sony Corporation: "MTC Operation with a Narrowband PDCCH", 3GPP TSG-RAN WG1 Meeting #80, R1-150428, Athens, Greece, Feb. 9-13, 2015, 16 pages, Feb. 18, 2015.
Szabo G., et al., "Service Aware Adaptive DRX Scheme," Globecom Workshops (GC Wkshps), Dec. 2014, pp. 1132-1138.
Taiwan Search Report—TW105139015—TIPO—Aug. 24, 2020.

MACRO AND MICRO DISCONTINUOUS RECEPTION

CROSS REFERENCES

The present Application is a Continuation of U.S. patent application Ser. No. 17/383,400 by Agarwal et al., entitled "Macro and Micro Discontinuous Reception" filed Jul. 22, 2021, which is a Continuation of U.S. patent application Ser. No. 16/871,904 by Agarwal et al., entitled "Macro and Micro Discontinuous Reception" filed May. 11, 2020, which is a Continuation of U.S. patent application Ser. No. 15/927,000 by Agarwal et al., entitled "Macro and Micro Discontinuous Reception" filed Mar. 20, 2018, which is a Continuation Application that claims priority to U.S. patent application Ser. No. 15/188,720 by Agarwal et al., entitled "Macro and Micro Discontinuous Reception" filed Jun. 21, 2016, which claims priority to: U.S. Provisional Patent Application No. 62/265,244 by Agarwal et al., entitled "Macro and Micro Discontinuous Reception," filed Dec. 9, 2015, assigned to the assignee hereof, and expressly incorporated by reference herein; U.S. Provisional Patent Application No. 62/265,249 by Agarwal et al., entitled "Receiving on Transmit and Transmitting on Receive," filed Dec. 9, 2015, assigned to the assignee hereof, and expressly incorporated by reference herein; and U.S. Provisional Patent Application No. 62/265,256 by Agarwal et al., entitled "Macro and Micro Discontinuous Transmission," filed Dec. 9, 2015, assigned to the assignee hereof, and expressly incorporated by reference herein.

The present Application for Patent is related to: U.S. patent application Ser. No. 15/188,854 by Agarwal et al., entitled "Macro and Micro Discontinuous Transmission" filed Jun. 21, 2016, assigned to the assignee hereof, and expressly incorporated by reference herein; and U.S. patent application Ser. No. 15/188,798 by Agarwal et al., entitled "Receiving on Transmit and Transmitting on Receive," filed Jun. 21, 2016, assigned to the assignee hereof, and expressly incorporated by reference herein.

INTRODUCTION

The following relates generally to wireless communication, and more specifically to macro and micro discontinuous reception (DRX).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a UE may enter a DRX mode to conserve power. When the UE is in the DRX mode, it may periodically power up a radio to monitor for and receive data, and then power down until the next DRX on duration. However, powering up a radio when there is no data to receive may still consume a significant amount of power. This may reduce the time that the UE can operate using battery power.

SUMMARY

A wireless device may receive a downlink (DL) reception indication during an active duration of a DRX configuration. The DL reception indication may indicate the presence of a reception opportunity following an inactivity interval, as well as the length of the inactivity interval. The wireless device may refrain from DL monitoring during the inactivity interval. In some cases, the wireless device may enter a sleep mode during the inactivity interval and wake up to receive the data during the reception opportunity. In some examples, the wireless device may use the inactivity interval to communicate using a different radio access technology (RAT).

A method of wireless communication is described. The method may include receiving a DL reception indication during an active duration of a DRX configuration, identifying an inactivity interval based at least in part on the DL reception indication, identifying a reception opportunity for DL data following the inactivity interval based at least in part on the DL reception indication, and listening for a subsequent DL reception indication during the reception opportunity.

An apparatus for wireless communication is described. The apparatus may include a processor and memory in electronic communication with the processor. The processor and memory may be configured to receive a DL reception indication during an active duration of a DRX configuration, identify an inactivity interval based at least in part on the DL reception indication, identify a reception opportunity following the inactivity interval based at least in part on the DL reception indication, and listen for a subsequent DL reception indication during the reception opportunity.

Another apparatus for wireless communication is described. The apparatus may include means for receiving a DL reception indication during an active duration of a DRX configuration, means for identifying an inactivity interval based at least in part on the DL reception indication, means for identifying a reception opportunity following the inactivity interval based at least in part on the DL reception indication, and means for listening for a subsequent DL reception indication during the reception opportunity.

A non-transitory computer-readable medium storing code for wireless communication is described. The code may include instructions executable to receive a DL reception indication during an active duration of a DRX configuration, identify an inactivity interval based at least in part on the DL reception indication, identify a reception opportunity following the inactivity interval based at least in part on the DL reception indication, and listen for a subsequent DL reception indication during the reception opportunity.

Some examples of the method, apparatuses, or non-transitory computer-readable medium may include operations, features, means, or instructions for modifying a DRX operation based at least in part on the DL reception indication. In some examples, the identified reception opportunity may be different from an ON duration of the DRX configuration.

Some examples of the method, apparatuses, or non-transitory computer-readable medium may include operations, features, means, or instructions for identifying a subsequent reception opportunity and a subsequent inactivity interval based at least in part on listening for the subsequent DL reception indication.

In some examples of the method, apparatuses, or non-transitory computer-readable medium, listening for the subsequent DL reception indication may be associated with a first receiver power. Some examples of the method, apparatuses, or non-transitory computer-readable medium may include operations, features, means, or instructions for receiving a DL transmission during the subsequent reception opportunity, wherein receiving the DL transmission may be associated with a second receiver power greater than the first receiver power.

In some examples of the method, apparatuses, or non-transitory computer-readable medium, listening for the subsequent DL reception indication may be associated with a first receiver bandwidth. Some examples of the method, apparatuses, or non-transitory computer-readable medium may include operations, features, means, or instructions for receiving a DL transmission during the subsequent reception opportunity, wherein receiving the DL transmission may be associated with a second receiver bandwidth greater than the first receiver bandwidth.

Some examples of the method, apparatuses, or non-transitory computer-readable medium may include operations, features, means, or instructions for entering a sleep mode during the subsequent inactivity interval, and waking up from the sleep mode for receiving a downlink transmission during the subsequent reception opportunity.

Some examples of the method, apparatuses, or non-transitory computer-readable medium may include operations, features, means, or instructions for identifying an absence of a subsequent reception opportunity based at least in part on listening for the subsequent DL reception indication, and powering down a radio based at least in part on the absence of a subsequent reception opportunity. Some examples of the method, apparatuses, or non-transitory computer-readable medium may include operations, features, means, or instructions for identifying a DRX sleep indication based at least in part on listening for the subsequent DL reception indication, and powering down a radio based at least in part on the DRX sleep indication.

In some examples of the method, apparatuses, or non-transitory computer-readable medium, receiving the DL reception indication may be associated with a first receiver power and listening for the subsequent DL reception indication may be associated with a second receiver power, different from the first receiver power. In some examples of the method, apparatuses, or non-transitory computer-readable medium, receiving the DL reception indication may be associated with a first receiver bandwidth and listening for the subsequent DL reception indication may be associated with a second receiver bandwidth, different from the first receiver bandwidth.

Some examples of the method, apparatuses, or non-transitory computer-readable medium may include operations, features, means, or instructions for refraining from DL monitoring during the inactivity interval. Some examples of the method, apparatuses, or non-transitory computer-readable medium may include operations, features, means, or instructions for entering a sleep mode during the inactivity interval, and waking up from the sleep mode to listen for the subsequent DL reception indication.

In some examples of the method, apparatuses, or non-transitory computer-readable medium, the sleep mode may include a lower receiver power than a wake mode. In some examples of the method, apparatuses, or non-transitory computer-readable medium, the inactivity interval may be longer than or shorter than a cycle of the DRX configuration.

In some examples of the method, apparatuses, or non-transitory computer-readable medium, the DL reception indication may include an indication of a duration of the inactivity interval. In some examples of the method, apparatuses, or non-transitory computer-readable medium, the DL reception indication may be received in a physical downlink control channel (PDCCH) or a media access control (MAC) control element (CE).

In some examples of the method, apparatuses, or non-transitory computer-readable medium, the DL reception indication may be received using a first RAT, and in some examples the method, apparatuses, or non-transitory computer-readable medium may include operations, features, means, or instructions for communicating during the inactivity interval using a second RAT.

In some examples of the method, apparatuses, or non-transitory computer-readable medium, the active duration may include an on duration of the DRX configuration or a previous reception opportunity. Some examples of the method, apparatuses, or non-transitory computer-readable medium may include operations, features, means, or instructions for transmitting a gap size request, wherein a duration of the inactivity interval may be based at least in part on the gap size request. In some examples of the method, apparatuses, or non-transitory computer-readable medium, a duration of the inactivity interval may be based at least in part on a network load, a scheduling condition, a latency tolerance, a traffic profile, or any combination thereof.

A method of wireless communication is described. The method may include transmitting a first DL reception indication for a UE during an active duration of a DRX configuration, the DL reception indication indicating a first inactivity interval and a first reception opportunity following the first inactivity interval, and transmitting a second DL reception indication for the UE during the first reception opportunity.

An apparatus for wireless communication is described. The apparatus may include a processor and memory in electronic communication with the processor. The processor and memory may be configured to transmit a first DL reception indication for a UE during an active duration of a DRX configuration, the DL reception indication indicating a first inactivity interval and a first reception opportunity following the first inactivity interval, and transmit a second DL reception indication for the UE during the first reception opportunity.

Another apparatus for wireless communication is described. The apparatus may include means for transmitting a first DL reception indication for a UE during an active duration of a DRX configuration, the DL reception indication indicating a first inactivity interval and a first reception opportunity following the first inactivity interval, and means for transmitting a second DL reception indication for the UE during the first reception opportunity.

A non-transitory computer-readable medium storing code for wireless communication is described. The code may include instructions executable to transmit a first DL reception indication for a UE during an active duration of a DRX configuration, the DL reception indication indicating a first inactivity interval and a first reception opportunity following the first inactivity interval, and transmit a second DL reception indication for the UE during the first reception opportunity.

Some examples of the method, apparatuses, or non-transitory computer-readable medium may include operations, features, means, or instructions for modifying a DRX operation based at least in part on the first DL reception indication. In some examples of the method, apparatuses, or non-transitory computer-readable medium, the first reception opportunity may be different from an ON duration of the DRX configuration. In some examples of the method, apparatuses, or non-transitory computer-readable medium, the second DL reception indication indicates a second reception opportunity that does not overlap with the first reception opportunity.

In some examples of the method, apparatuses, or non-transitory computer-readable medium, transmitting the second DL reception indication may be associated with a first receiver power, and the method, apparatuses, or non-transitory computer-readable medium may include operations, features, means, or instructions for transmitting a DL transmission during a second reception opportunity indicated by the second DL reception indication, wherein transmitting the DL transmission may be associated with a second receiver power greater than the first receiver power.

In some examples of the method, apparatuses, or non-transitory computer-readable medium, transmitting the second DL reception indication may be associated with a first receiver bandwidth, and the method, apparatuses, or non-transitory computer-readable medium may include operations, features, means, or instructions for transmitting a DL transmission during a second reception opportunity indicated by the second DL reception indication, wherein transmitting the DL transmission may be associated with a second receiver bandwidth greater than the first receiver bandwidth. In some examples of the method, apparatuses, or non-transitory computer-readable medium, the second DL reception indication may include a DRX sleep indication for the UE.

In some examples of the method, apparatuses, or non-transitory computer-readable medium, transmitting the first DL reception indication may be associated with a first receiver power and transmitting the second DL reception indication may be associated with a second receiver power, different from the first receiver power. In some examples of the method, apparatuses, or non-transitory computer-readable medium, transmitting the first DL reception indication may be associated with a first receiver bandwidth and transmitting the second DL reception indication may be associated with a second receiver bandwidth, different from the first receiver bandwidth. Some examples of the method, apparatuses, or non-transitory computer-readable medium may include operations, features, means, or instructions for refraining from transmitting for the UE during the first inactivity interval or a second inactivity interval indicated by the second DL reception indication.

In some examples of the method, apparatuses, or non-transitory computer-readable medium, the first inactivity interval or a second inactivity interval indicated by the second DL reception indication may be longer than or shorter than a cycle of the DRX configuration. In some examples of the method, apparatuses, or non-transitory computer-readable medium, the first DL reception indication may include an indication of a duration of the first inactivity interval, or the second DL reception indication may include an indication of a duration of a second inactivity interval.

In some examples of the method, apparatuses, or non-transitory computer-readable medium, the first DL reception indication or the second DL reception indication may be transmitted in a PDCCH or a MAC CE. In some examples of the method, apparatuses, or non-transitory computer-readable medium, the active duration may include an on duration of the DRX configuration or a previous reception opportunity.

Some examples of the method, apparatuses, or non-transitory computer-readable medium may include operations, features, means, or instructions for receiving a gap size request from the UE, wherein a duration of the first inactivity interval or a second inactivity interval indicated by the second DL reception indication may be based at least in part on the received gap size request. In some examples of the method, apparatuses, or non-transitory computer-readable medium, a duration of the first inactivity interval or a second inactivity interval indicated by the second DL reception indication may be based at least in part on a network load, a scheduling condition, a latency tolerance, a traffic profile, or any combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
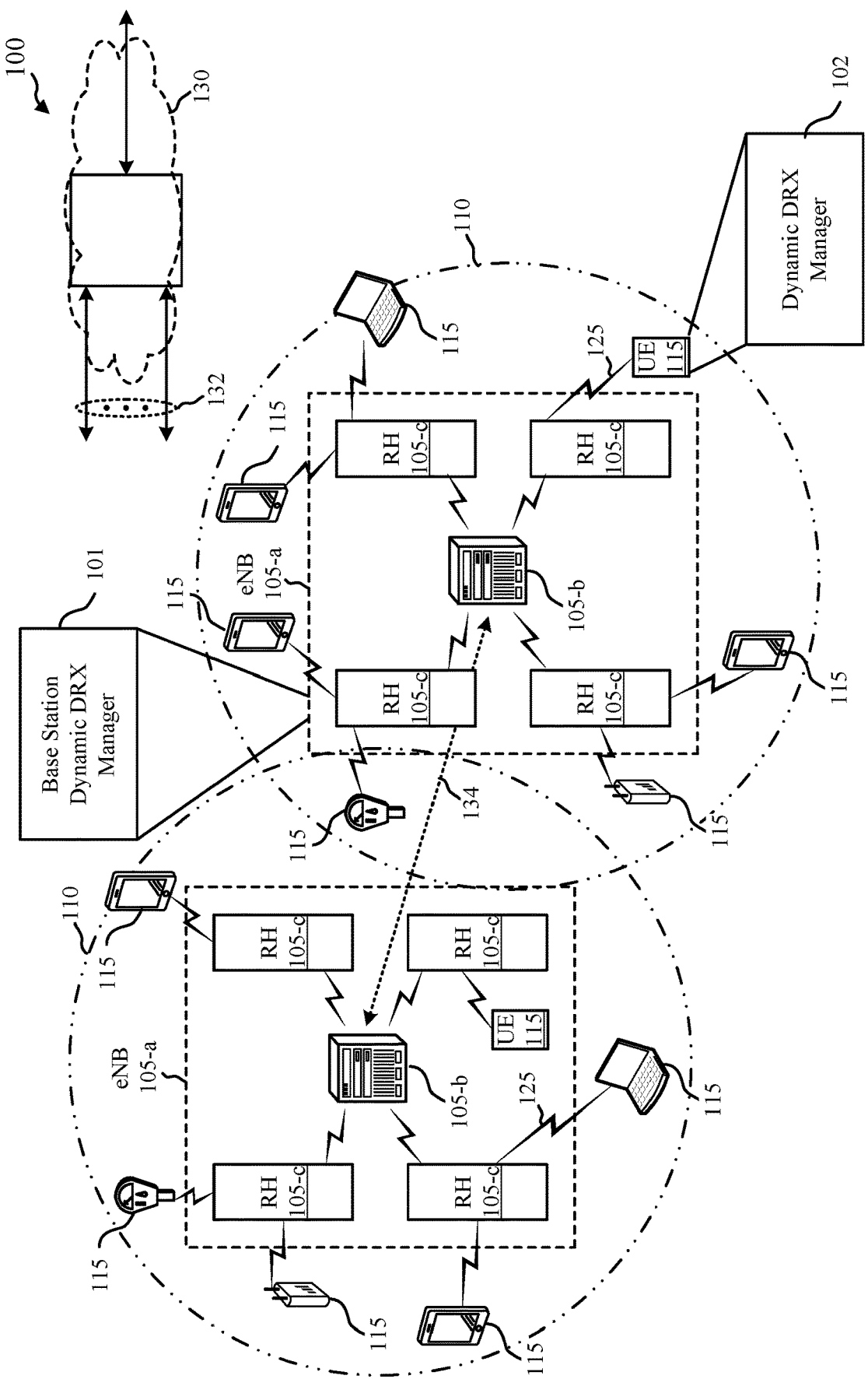
FIG. 1 illustrates an example of a wireless communications system that supports macro and micro DRX, in accordance with one or more aspects of the present disclosure.

A wireless device may use a DRX configuration to enable the efficient use of power at the wireless device, which may, for example, conserve energy stored in a battery. In some examples, after a radio resource control (RRC) connection has been established with a base station, a UE may enter a sleep mode when not actively communicating. A DRX cycle may determine how frequently the UE wakes up to check for incoming transmissions, such as paging messages, scheduling information, and data. As a result, a UE may monitor for incoming data during on durations (e.g., a number of DL subframes that the UE remains in an awake mode to receive data) associated with the DRX configuration.

Power may be further conserved by reducing the amount of power consumed during each on duration. For example, scheduling a gap (e.g., an inactivity interval) between the on duration and a time when a UE is scheduled to receive data (e.g., a reception opportunity) may enable a UE to partially power a radio during the on duration, enter a sleep mode prior to the scheduled reception period, and then fully power the radio during the reception opportunity to receive the data. Thus, a device may have a macro DRX (M-DRX) configuration (e.g., the RRC configured DRX), and a micro DRX (MI-DRX) configuration (e.g., the inactive period between the on duration, or a subsequent MI-DRX indication, and the reception opportunity). In some examples, the described features may modify operations according to a DRX configuration of a device, such as providing active durations different from those associated with the DRX configuration. The term 'active duration' may refer to both the on duration of the DRX configuration and the reception opportunity, (e.g., the time during which the device has a radio powered to receive data) as well as time a UE may remain awake between transmissions (e.g., waiting for an inactivity timer).

An indication of the presence of a reception opportunity and the length of the scheduled gap may be transmitted to the UE during the on duration of the M-DRX cycle (e.g., via an M-DRX message). That is, the M-DRX message may indicate when the UE should wake up again for a data transmission to be received. For example, the M-DRX message may include a parameter specifying the amount of time between receiving the M-DRX message and the beginning of a subsequent DL transmission. The UE may then enter a sleep mode for a period of time before data is received, or use the radio for communicating via another RAT.

A UE may listen for subsequent indication during the reception opportunity (e.g., a MI-DRX message), and the subsequent indication may signal the presence of a subsequent reception opportunity. The MI-DRX may enable a UE to determine whether it should enter a M-DRX sleep mode (e.g., instead of, or in addition to the use of a M-DRX inactivity timer). Thus, after receiving the information indicated by the M-DRX message, the UE may be dynamically signaled when to wake up for a subsequent data transmission. This may enable the UE to sleep between periods of data activity within a DRX cycle. In some cases, the MI-DRX message may also indicate a reduced inactivity interval (e.g., the presence of an on duration prior to the next DRX on duration specified by the RRC configuration).

Dynamic assignment of wake up occasions for different UEs may also result in network power savings. That is, UE wakeup times may be staggered if traffic is high, or grouped when traffic is low (e.g., to enable a base station to power down the transmitting radio). The determination of when to schedule UE wakeup times may be based on network load, scheduling delays, service latency tolerance, or a traffic profile. In some cases, UEs may transmit a gap size request indicating a desired inactivity interval duration (e.g., following M-DRX or MI-DRX messages).

Aspects of the disclosure are initially described in the context of a wireless communication system. Further examples are provided for configurations using inactivity intervals between DRX on durations. Aspects of the disclosure are further illustrated by and described with reference to apparatus diagrams, system diagrams, and flowcharts that relate to macro and micro DRX.

FIG. 1 illustrates an example of a wireless communication system 100 that supports macro and micro DRX, in accordance with one or more aspects of the present disclosure. The wireless communication system 100 may include network devices 105, UEs 115, and a core network 130. Wireless communication system 100 may support dynamic DRX configurations to allow for reduced power consumption. For example, wireless communication system 100 may support both regularly scheduled DRX on durations (e.g., associated with a "macro" DRX sleep period) and dynamic DRX reception opportunities (e.g., associated with a "micro" DRX sleep period).

The core network 130 may provide user authentication, access authorization, tracking, Internet Protocol (IP) connectivity, and other access, routing, or mobility functions. At least some of the network devices 105 (e.g., network device 105-$a$, which may be an example of an eNB or a base station, or network device 105-$b$, which may be an example of an access node controller (ANC)) may interface with the core network 130 through backhaul links 132 (e.g., S1, S2, etc.) and may perform radio configuration and scheduling for communication with the UEs 115. In various examples, the network devices 105-$b$ may communicate, either directly or indirectly (e.g., through core network 130), with each other over backhaul links 134 (e.g., X1, X2, etc.), which may be wired or wireless communication links.

Each network device 105-$b$ may also communicate with a number of UEs 115 through a number of other network devices 105-$c$, where network device 105-$c$ may be an example of a smart radio head (RH). In alternative configurations, various functions of each network device 105 may be distributed across various network devices 105 (e.g., radio heads and access network controllers) or consolidated into a single network device 105 (e.g., a base station).

A macro cell may cover a relatively large geographic area 110 (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area 110 and may allow unrestricted access by UEs 115 with service subscriptions with a network provider. A femto cell also may cover a relatively small geographic area 110 (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

In some cases, a UE 115 may monitor a communication link 125 continuously for an indication that the UE 115 may receive data. In other cases (e.g., to conserve power and extend battery life) a UE 115 may be configured with a DRX cycle. A DRX cycle consists of an "on duration" when the UE 115 may monitor for control information (e.g., on PDCCH) and a "DRX period" when the UE115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle, and continuous reception may be controlled by an internal timer or by messaging from a network device 105. A UE 115 may receive scheduling messages on PDCCH during the on duration. While monitoring PDCCH for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

The wireless communication system 100 may support synchronous or asynchronous operation. For synchronous operation, the network devices 105-a and/or network devices 105-c may have similar frame timing, and transmissions from different network devices 105-a and/or network devices 105-c may be approximately aligned in time. For asynchronous operation, the network devices 105-a and/or network devices 105-c may have different frame timings, and transmissions from different network devices 105-a and/or network devices 105-c may not be aligned in time. The techniques described herein may be used for either synchronous or asynchronous operations.

Communication networks that may accommodate disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an IoE device, or the like. A UE may be able to communicate with various types of network devices 105-a, network devices 105-c, base stations, access points, or other network devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a network device 105-c or another UE 115, and/or DL channels to a UE 115 from a network device 105-c or another UE 115. The DL channels may be referred to as forward link channels, and the UL channels may be referred to as reverse link channels. Control information and data may be multiplexed on an uplink channel or downlink according to various techniques. Control information and data may be multiplexed on a downlink channel, for example, using time-division multiplexing (TDM) techniques, frequency-division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

One or more of network devices 105 may include a base station dynamic DRX manager 101, which may provide macro and micro DRX configurations that include a combination of active durations and inactivity durations. In some examples, the base station dynamic DRX manager 101 may transmit a DL reception indication for a UE 115 during an active duration of a DRX configuration (e.g., an M-DRX configuration, an MI-DRX configuration, etc.), where the DL reception indication may include an indication of an inactivity interval, and/or a reception opportunity following the inactivity interval. The base station dynamic DRX manager 101 may transmit a subsequent transmission to the UE during the reception opportunity following the inactivity interval, which may include using a different transmission configuration. UEs 115 may include a dynamic DRX manager 102, which may receive a DL reception indication during an active duration of a DRX configuration and identify an inactivity interval based on the DL reception indication. The dynamic DRX manager 102 may also identify a reception opportunity for DL data following the inactivity interval based on the DL reception indication. In some cases, the DL data may include control signaling, user data, or both.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, a wireless communications system may utilize one enhanced component carrier (ECC), or more than one ECC. An ECC may be characterized by one or more features including: flexible bandwidth, variable length TTIs, and modified control channel configuration. In some cases, an ECC may be associated with a carrier aggregation configuration or a dual connectivity configuration (e.g., when multiple serving cells have a suboptimal backhaul link). An ECC may also be configured for use in unlicensed spectrum or shared spectrum (where more than one operator is licensed to use the spectrum). An ECC characterized by flexible bandwidth may include one or more segments that may be utilized by UEs 115 that are not capable of monitoring the whole bandwidth or prefer to use a limited bandwidth (e.g., to conserve power).

In some cases, an ECC may utilize a variable TTI length, which may include use of a reduced or variable symbol duration. In some cases, the symbol duration may remain the same, but each symbol may represent a distinct TTI. In some cases, an ECC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an ECC may utilize an ePDCCH for DL control information). For example, one or more control channels of an ECC may utilize FDM scheduling to accommodate flexible bandwidth use. Other control channel modifications include the use of additional control channels (e.g., for eMBMS scheduling, or to indicate the length of variable length UL and DL bursts), or control channels transmitted at different intervals. An ECC may also include modified or additional HARQ related control information.

Thus, a wireless device, such as network device 105 or UE 115, may receive a DL reception indication during an active duration of a DRX configuration (e.g., an M-DRX configuration, an MI-DRX configuration, etc.). The DL reception indication may indicate the presence of a reception opportunity following an inactivity interval, as well as the length of the inactivity interval. The wireless device may refrain from DL monitoring during the inactivity interval, which may include modifying an operation of the DRX configuration. In some cases, the wireless device may enter a sleep mode during the inactivity interval and wake up to receive DL data or a subsequent DL reception indication during the reception opportunity. In some examples, the wireless device may use the inactivity interval to communicate using a different radio access technology RAT (e.g., via a wireless local area network (WLAN) RAT, etc.).

Figure 2:
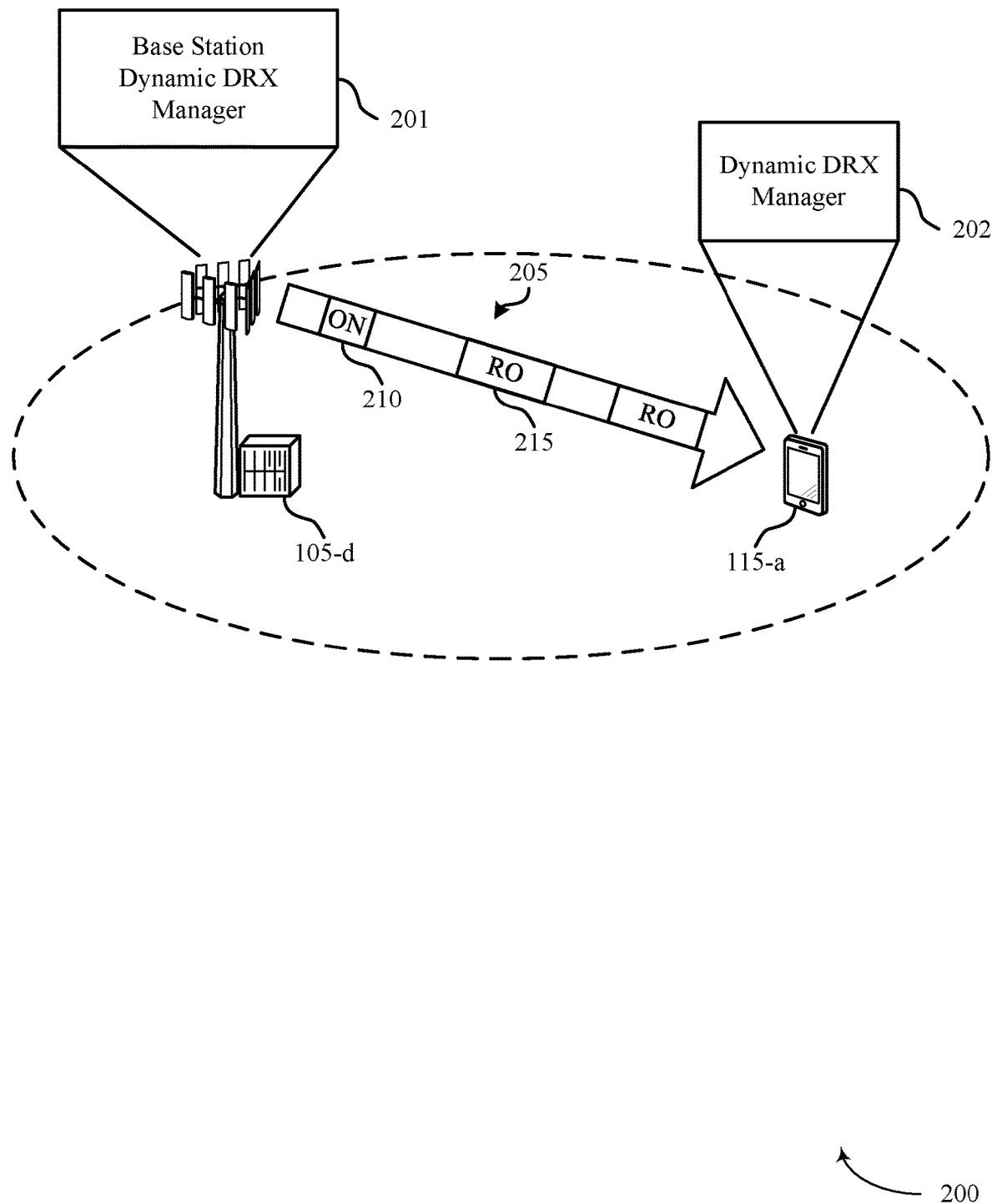
FIG. 2 illustrates an example of a wireless communications system that supports macro and micro DRX, in accordance with one or more aspects of the present disclosure.

FIG. 2 illustrates an example of a wireless communication system 200 that supports macro and micro DRX, in accordance with one or more aspects of the present disclosure. Wireless communication system 200 may include a network device 105-d, and a UE 115-a, which may be examples of the corresponding devices described with reference to FIG. 1. Wireless communication system 200 may support dynamic DRX configurations to allow for reduced power consumption. For example, wireless communication system 200 may support both regularly scheduled DRX on durations (e.g., associated with a M-DRX sleep period) and dynamic DRX reception opportunities (e.g., associated with a MI-DRX sleep period).

Wireless communication system 200 may use M-DRX and MI-DRX configurations to support an efficient use of battery power. After a wireless link 205 has been established between network device 105-d and UE 115-a, UE 115-a may enter a sleep mode when not actively communicating. The M-DRX and MI-DRX configurations may determine how frequently UE 115-a wakes up to check for incoming transmissions, such as paging messages, scheduling information, and data. For example, based on an M-DRX or MI-DRX configuration, UE 115-a may wake up during periodic subframes to monitor control channels (e.g., a PDCCH) for data scheduled for UE 115-a. As described herein, the UE 115-a may be configured with both M-DRX cycles and micro DRX (MI-DRX) cycles.

Network device 105-d and UE 115-a may include a base station dynamic DRX manager 201 and dynamic DRX manager 202, respectively. Base station dynamic DRX manager may transmit a DL reception indication to UE 115-a during an active duration of a DRX configuration (e.g., an active duration of an M-DRX cycle, an active duration of an MI-DRX cycle, etc.), where the DL reception indication includes an indication of an inactivity interval followed by a reception opportunity. The active duration may refer to either an on duration of a DRX cycle, or a reception opportunity. The base station dynamic DRX manager 201 may also transmit DL data or a subsequent DL reception indication to UE 115-a during a reception opportunity following the inactivity interval, which may include transmitting with a second transmission configuration. Dynamic DRX manager 202 may receive a DL reception indication during an active duration of a DRX configuration and identify an inactivity interval based on the DL reception indication. The dynamic DRX manager 202 may identify a DL reception opportunity (e.g., for receiving DL data, a subsequent DL reception indication, etc.) following the inactivity interval based on the DL reception indication. The dynamic DRX manager 202 may also listen for a subsequent DL reception indication during the reception opportunity.

UE 115-a may monitor the channel data during on durations 210 associated with the DRX configuration. An on duration (ON) 210 may correspond to an initial number of DL subframes that UE 115-a remains awake to receive data. Network device 105-d may transmit an indication of whether further data will be transmitted to UE 115-a during a subsequent reception opportunity (RO) 215. In some cases, UE 115-a may use a reduced power monitoring configuration during the on duration 210.

In some cases, following the successful decoding of a DL transmission, UE 115-a may stay awake and begin an inactivity timer. The inactivity timer may correspond to the time that UE 115-a waits after the last successful decoding of a PDCCH until the reception of another control message. In the event that no message is received, UE 115-a may re-enter DRX. In some cases, the inactivity timer may be restarted following a first DL message but may not be used after subsequent messages.

While an on duration 210 may refer to an initial monitoring period, the total duration that UE 115-a is awake may be referred to as the active duration. The active duration includes the on duration 210 of the DRX cycle, the reception opportunity 215 during which UE 115-a is actively receiving data, and in some cases, a waiting period during which an inactivity timer has not expired (e.g., UE 115-a is inactive, but awake). In some cases, an active duration may also include time spent waiting for a DL retransmission after sending a negative acknowledgement (NACK). Thus, the minimum active duration may be equal to the on duration 210. The on duration 210 and inactivity timer can have fixed durations, while the active duration may vary in length based on other factors, such as scheduling decisions and UE decoding success.

The amount of time that UE 115-*a* remains active may impact power consumption. If the inactivity timer duration is set conservatively (e.g., a long inactivity timer value), UE 115-*a* may stay active for an extended period and consume a significant amount of power. Alternatively, if the network sets the inactivity timer duration aggressively (e.g., a short inactivity timer value), the UE 115-*a* may experience greater latency, as UE 115-*a* may not wake up to receive a message until a subsequent on duration.

In some cases, aspects of M-DRX or MI-DRX may be configured on a per UE basis. That is, a single M-DRX or MI-DRX configuration may be applied to a given UE 115 at any time. For example, when UE 115-*a* has only one service that is being handled through the allocation of predefined resources, the M-DRX or MI-DRX configuration may allow for other signaling (such as RRC signaling) to be sent during a remaining portion of the active duration discussed above. In some cases, there may also be other RRC or MAC sub-states that distinguish between different levels of M-DRX or MI-DRX. In some cases, aspects of M-DRX or MI-DRX may be configured on per-bearer basis.

Available M-DRX or MI-DRX configurations may be controlled by the network and may range from non-DRX configurations (e.g., a DRX cycle is not used) up to a maximum DRX cycle duration. For example, the maximum DRX cycle may have the same duration as a paging DRX cycle used in a connection management mode (e.g., an evolved packet system (EPS) connection management (ECM)-IDLE mode). In some cases, measurement requirements and reporting criteria can differ according to the DRX interval length (e.g., relatively long DRX intervals may be associated with relatively relaxed measurement requirements).

Some communications may take place independent of a M-DRX or MI-DRX configuration. For example, UE 115-*a* may use the first available random access channel (RACH) opportunity to send an uplink measurement report. HARQ operations related to data transmission may also be independent of M-DRX or MI-DRX operation. Thus, UE 115-*a* may wake up to monitor a control channel for any retransmissions or acknowledgment/negative acknowledgement (ACK/NACK) signaling regardless of the M-DRX or MI-DRX configuration. In some cases, a timer may be used to limit the time UE 115-*a* stays awake for a retransmission. In some examples, new transmissions may only take place during the active duration, so that when UE 115-*a* is waiting for a retransmission, it may not have to stay awake during the round trip time (RTT).

In some DRX configurations, UE 115-*a* may be further configured with an on duration timer, during which UE 115-*a* may monitor for control messages that include possible data allocations. Some DRX configurations may enable periodic channel quality indicator (CQI) reports to be sent by UE 115-*a* during the active duration. In some cases, RRC signaling may be used to coordinate periodic CQI reports so that they are sent during the on duration 210. Additionally, a timer for a timing advance group (TAG) in UE 115-*a* may be used to enable UE 115-*a* to obtain a timing advance for each TAG.

If UE 115-*a* has not successfully decoded any PDCCH transmissions during an on duration 210, it may re-enter DRX sleep (e.g., if allowed by the M-DRX or MI-DRX configuration). The ability to re-enter sleep may also apply to the sub-frames where UE 115-*a* has been allocated predefined resources. If UE 115-*a* successfully decodes a PDCCH transmission, UE 115-*a* may stay awake until the expiration of the inactivity timer or until a MAC control message tells UE 115-*a* to re-enter DRX sleep.

The process that UE 115-*a* follows for re-entering DRX may have different configurations. For example, if a short DRX cycle is configured, UE 115-*a* may first use the short DRX cycle and subsequently change to a long DRX cycle following a relatively long period of inactivity. In other cases, UE 115-*a* may enter the long DRX cycle directly.

In some cases, a network may identify whether UE 115-*a* remains within a geographic coverage area 110 by requesting that UE 115-*a* send periodic signals to the network. In wireless networks using carrier aggregation (CA), if UE 115-*a* is configured with only one serving cell (e.g., a primary cell (PCell)) the DRX associated with CA-enabled wireless systems may be used to determine the cycle for other component carriers. For example, the same DRX operation may be applied to all configured and activated serving cells (e.g., each cell may have an identical active duration for PDCCH monitoring). In networks using dual connectivity (DC), separate DRX configurations can be applied to a master cell group (MCG) and a secondary cell group (SCG), and group specific DRX operation may be applied to all configured and activated serving cells in the same cell group.

A DRX cycle used by UE 115-*a* when in a connected mode (e.g., RRC_CONNECTED mode) may be different from a DRX cycle used by UE 115-*a* when not connected (e.g., RRC_IDLE mode). For example, connected mode DRX may have a longer on duration 210. The power consumption of connected mode DRX may be reduced by limiting the time that a radio is powered for each DRX on duration 210.

Placing a gap between the on duration 210 and the time when UE 115-*a* is scheduled to receive data during a reception opportunity 215 may enable UE 115-*a* to partially power a radio during the on duration 210, enter a sleep mode (or retune the radio) prior to the scheduled reception period, and then fully power the radio for a reception opportunity 215.

For example, an indication may be transmitted to UE 115-*a* at the beginning of an on duration 210 (e.g., in a M-DRX message). The message may indicate when UE 115-*a* should wake up again for reception opportunity 215. That is, the M-DRX message may include a parameter specifying the amount of time between receiving the message and the beginning of a subsequent DL transmission. UE 115-*a* may then remain in a sleep mode or retune the radio. This may reduce UE power consumption. In some cases, restricting the modulation and coding scheme (MCS), aggregation level, or bandwidth of the M-DRX message may provide additional power consumption savings.

In some cases, a subsequent indication received during a reception opportunity 215 may be used to allow UE 115-*a* to enter a sleep mode prior to another reception opportunity 215 or DRX on duration 210 (e.g., in place of, or before the expiration of an inactivity timer). This may enable UE 115-*a* to sleep between periods of data activity within a DRX cycle. For example, a MI-DRX indication may include a parameter indicating the amount of time between reception of the MI-DRX message and a subsequent reception opportunity 215.

Dynamic assignment of wake up occasions for different UEs 115 may also result in network power savings. That is, UE wake up times may be staggered if traffic is high, or grouped when traffic is low (e.g., to enable network device 105-*d* to power down the transmitting radio). The determination of when to schedule UE wake up times may be based on network load, scheduling delays, service latency tolerance, or a traffic profile. In some cases, UEs 115-*a* may also transmit a gap size request indicating a desired duration between the initial on duration 210 (e.g., from a M-DRX message) and the next reception opportunity 215.

Figure 3A:
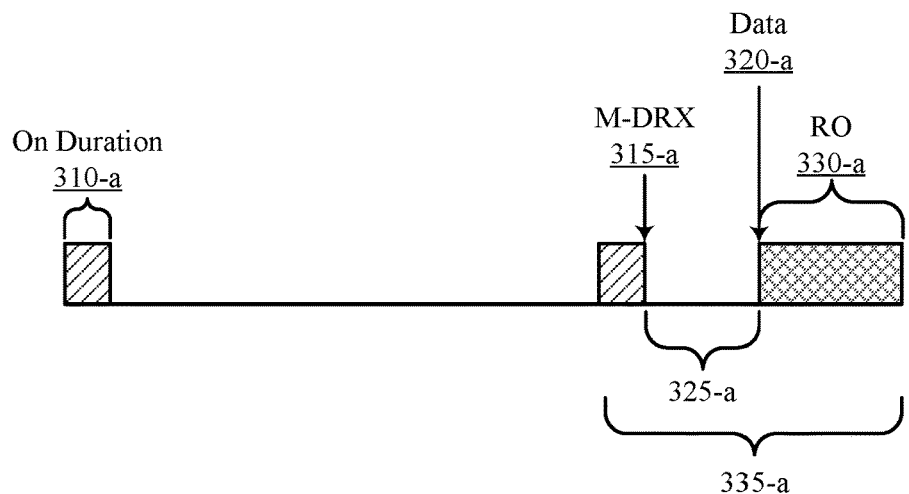
FIGS. 3A and 3B illustrate examples of DRX configurations that support macro and micro DRX, in accordance with one or more aspects of the present disclosure.
Figure 3B:
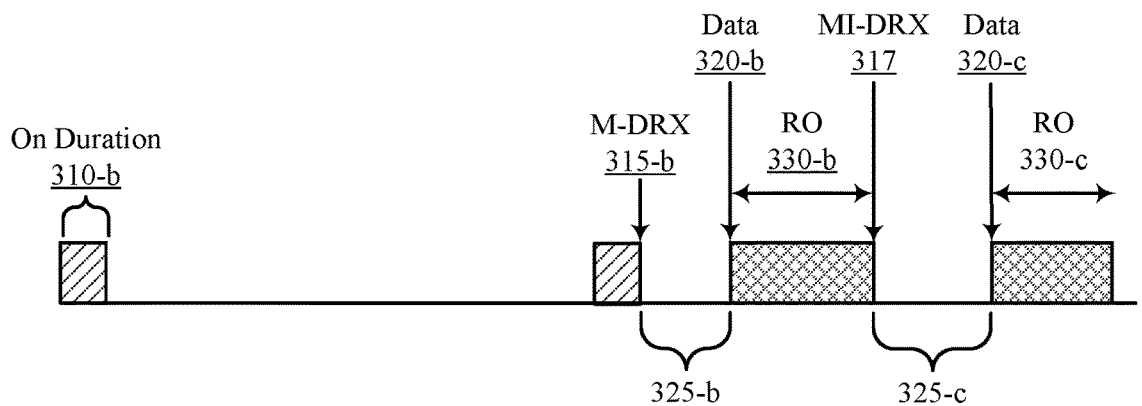

FIGS. 3A and 3B illustrate examples of DRX configurations 300 and 301 that support macro and micro DRX, in accordance with one or more aspects of the present disclosure. In some cases, DRX configurations 300 and 301 may represent aspects of techniques performed by a UE 115 or network device 105 as described with reference to FIGS. 1-2.

DRX configuration 300 may be an example of an inactivity interval duration between active durations of a DRX cycle, where the active duration may be an on duration, a reception opportunity, or both. When an RRC connection is established between a UE 115 and a network device 105, the UE 115 may establish the parameters of DRX configuration 300. That is, the UE 115 may wake up during an on duration 310-*a* to monitor for any incoming DL transmissions from the network device 105. If no DL transmissions are forthcoming, the UE 115 may go to sleep until a subsequent on duration 310 (e.g., during a M-DRX sleep period). If data 320-*a* is scheduled to be transmitted to the UE 115, the UE 115 may be configured to receive a M-DRX message 315-*a*.

The M-DRX message 315-*a* may indicate to the UE 115 the duration of an inactivity interval 325-*a*, during which the UE 115 may go to sleep, refrain from monitoring for data, or retune the radio (e.g., during a MI-DRX sleep period). For example, the M-DRX message 315 may include a parameter specifying the duration of the inactivity interval 325-*a* between receiving the M-DRX message 315-*a* and the beginning of a subsequent reception opportunity 330-*a*, which may be different from an ON duration of a DRX configuration. After reception of the M-DRX message 315-*a*, UE 115 may enter a sleep mode during the inactivity interval 325-*a* and wake up during the reception opportunity 330-*a*. During the reception opportunity 330-*a*, the UE may receive data from the network device 105. An active duration 335 of DRX configuration 300 may include an on duration 310-*a*, a reception opportunity 330-*a*, or both (but may exclude the inactivity interval 325-*a*). In some cases, M-DRX message 315-*a* may signal an inactivity interval 325 with length zero (e.g., no gap between the on duration 310 and a reception opportunity 330).

DRX configuration 301 may be an example of including multiple MI-DRX inactivity intervals 325. During the on duration 310-*b*, the UE 115 may monitor for incoming DL transmissions. If no DL transmissions are forthcoming, the UE 115 may go to sleep until a subsequent on duration 310. UE 115 may wake up for the subsequent on duration 310 and monitor for incoming DL transmissions. If data 320-*b* is scheduled to be transmitted to the UE 115, an M-DRX message 315-*b* may be received that indicates an inactivity interval 325-*b*, after which data may be received during a reception opportunity 330-*b*, as described with reference to FIG. 3A. In various examples, the reception opportunity 330-*b* may be different from an ON duration of a DRX configuration.

During reception opportunity 330-*b*, UE 115 may receive a MI-DRX message 317, where the MI-DRX message 317 may allow UE 115 to enter a MI-DRX sleep during inactivity interval 325-*c* prior to a subsequent reception opportunity 330 (e.g., reception opportunity 330-*c*). UE 115 may then go to sleep until the reception opportunity 330-*c* begins and data 320-*c* is received, which in some examples may include modifying a DRX operation (e.g., modifying a DRX operation as established during an RRC connection). In some examples, after reception opportunity 330, the UE 115 may enter a sleep mode until a subsequent M-DRX on duration 310 (e.g., based on an explicit sleep indication, an inactivity timer, the absence of a MI-DRX message 317, etc.). In some cases, the MI-DRX sleep period may overlap with a DRX on duration. For example, inactivity interval 325-*c* may be longer than a M-DRX period. In some cases, a UE 115 may refrain from waking up to monitor a channel during a scheduled on duration 310 if it falls within an indicated inactivity interval 325. In some examples, the reception opportunity 330-*c* may immediately follow the MI-DRX message 317 (e.g., as indicated by a zero or null inactivity interval 325-*c*, etc.), and the UE 115 may refrain from entering a sleep mode prior to receiving data 320-*c*.

Figure 4:
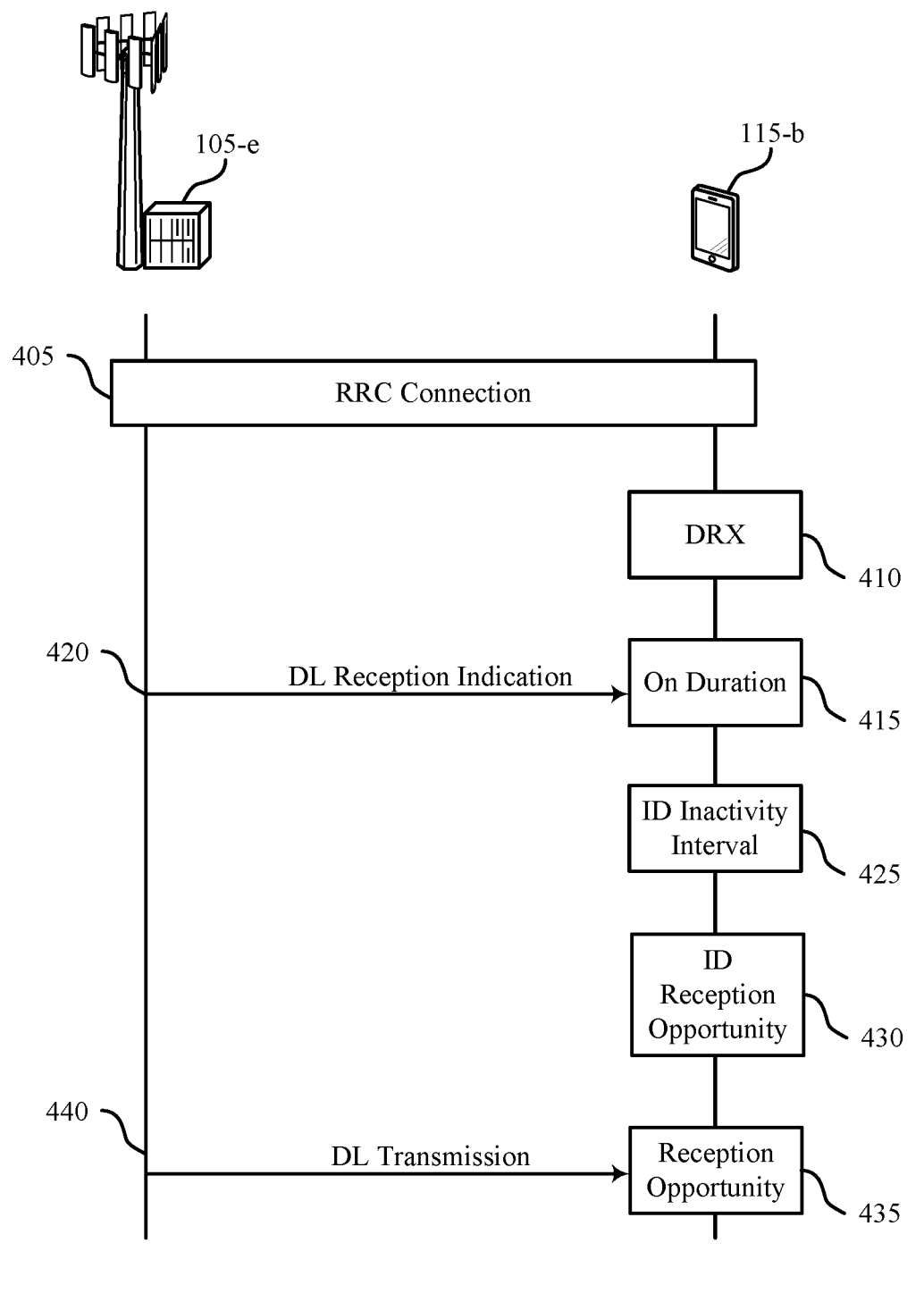
FIG. 4 illustrates an example of a process flow in a system that supports macro and micro DRX, in accordance with one or more aspects of the present disclosure.

FIG. 4 illustrates an example of a process flow 400 that supports macro and micro DRX, in accordance with one or more aspects of the present disclosure. Process flow 400 may include network device 105-*e* and UE 115-*a*, which may be examples of the corresponding devices described with reference to FIG. 1-2.

At 405, network device 105-*e* and UE 115-*b* may establish an RRC connection. Operations at 405 may be performed at the UE 115-*b* by a UE wireless communications manager (e.g., UE wireless communications manager 840 described with reference to FIG. 8), and may be performed in cooperation with a transmitter or receiver (e.g., a receiver 505 or 605, or a transmitter 515 or 635 as described with reference to FIG. 5 or 6, or a transceiver 825 as described with reference to FIG. 8). Additionally or alternatively, operations at 405 may be performed at the network device 105-*e* by a base station communications manager (e.g., base station communications manager 1235 described with reference to FIG. 12), and may be performed in cooperation with a transmitter or receiver (e.g., a receiver 905 or 1005, or a transmitter 915 or 1025 as described with reference to FIG. 9 or 10, or a transceiver 1225 as described with reference to FIG. 12).

At 410, UE 115-*b* may enter a DRX sleep mode according to a DRX configuration. Operations at 410 may be performed at the UE 115-*b* by a UE dynamic DRX manager (e.g., a UE dynamic DRX manager 510, 610, 700, or 805 as described with reference to FIGS. 5 through 8).

At 415, UE 115-*b* may enter an on duration according to the DRX configuration. Operations at 415 may be performed at the UE 115-*b* by a UE dynamic DRX manager (e.g., a UE dynamic DRX manager 510, 610, 700, or 805 as described with reference to FIGS. 5 through 8).

At 420, network device 105-*e* may transmit, and UE 115-*b* may receive, a DL reception indication during the on duration of the DRX configuration. In some cases, a DL reception indication may also be transmitted during a reception opportunity as described above. The DL reception indication may include an indication of a length of an inactivity interval. In some examples, network device 105-*e* may transmit the DL reception indication using a first transmission configuration at the network device 105-*e*. In some cases, the DL reception indication may be received at UE 115-*b* in a PDCCH or a MAC CE. Operations at 420 may be performed at the UE 115-*b* by a receiver (e.g., a receiver 505 or 605 as described with reference to FIG. 5 or 6, or a transceiver 825 as described with reference to FIG. 8), and may be performed in cooperation with a UE dynamic DRX manager (e.g., a UE dynamic DRX manager 510, 610, 700, or 805 as described with reference to FIGS. 5 through 7). Additionally or alternatively, operations at 420 may be performed at the network device 105-*e* by a transmitter (e.g., a transmitter 915 or 1025 as described with reference to FIG. 9 or 10, or a transceiver 1225 as described with reference to FIG. 12), and may be performed in cooperation with a base station dynamic DRX manager (e.g., a base station dynamic DRX manager 910, 1010, 1100, or 1205 as described with reference to FIGS. 9 through 12).

At 425, UE 115-*b* may identify the inactivity interval based at least in part on the received DL reception indication. In some cases, UE 115-*b* may enter a sleep mode during the inactivity interval, where the sleep mode includes a lower receiver power than a wake mode. In some cases, UE 115-*b* may refrain from DL monitoring during the inactivity interval. In some examples, the inactivity interval may be longer than or shorter than a cycle of the DRX configuration. In some cases, the DL reception indication may have been received using a first RAT, and UE 115-*b* may communicate during the inactivity interval using a second RAT. In some cases, UE 115-*b* may have transmitted, and network device 105-*e* may have received, a gap size request, and a length of the inactivity interval may have been determined based on the gap size request. In some examples, the length of the inactivity interval may be based on a network load, a scheduling condition, a latency tolerance, a traffic profile, or any combination thereof. Operations at 425 may be performed at the UE 115-*b* by a UE dynamic DRX manager (e.g., a UE dynamic DRX manager 510, 610, 700, or 805 as described with reference to FIGS. 5 through 8), and may be performed in cooperation with a receiver or a transmitter (e.g., a receiver 505 or 605 or a transmitter 515 or 635 as described with reference to FIG. 5 or 6, or a transceiver 825 as described with reference to FIG. 8).

At 430, UE 115-*b* may identify a reception opportunity following the inactivity interval based at least in part on the received DL reception indication. Operations at 430 may be performed at the UE 115-*b* by a UE dynamic DRX manager (e.g., a UE dynamic DRX manager 510, 610, 700, or 805 as described with reference to FIGS. 5 through 8).

At 435, UE 115-*b* may enter a reception mode during the identified reception opportunity, which in some examples may include waking up from a sleep mode. Operations at 435 may be performed at the UE 115-*b* by a UE dynamic DRX manager (e.g., a UE dynamic DRX manager 510, 610, 700, or 805 as described with reference to FIGS. 5 through 8), and may be performed in cooperation with a receiver (e.g., a receiver 505 or 605 as described with reference to FIG. 5 or 6, or a transceiver 825 as described with reference to FIG. 8).

At 440, network device 105-*e* may transmit, and UE 115-*b* may receive, a DL transmission during the identified reception opportunity. The DL transmission may be transmitted using a second transmission configuration at the network device 105-*e*. In some examples, the second transmission configuration may be associated with a higher receiver power at the UE 115-*b* than the first transmission configuration. In some examples, the second transmission configuration may be associated with a higher receiver bandwidth at the UE 115-*b* than the first transmission configuration. In some examples, the DL transmission at 440 may include a subsequent DL reception indication, and the UE 115-*b* may identify a subsequent reception opportunity based on the subsequent DL reception indication. In such examples, the network device 105-*e* may transmit a DL transmission (e.g., DL data, another DL reception indication, etc.) during the subsequent reception opportunity, which in various examples may be transmitted at with a transmission configuration associated with a different receiver power and/or a different receiver bandwidth than other transmission configurations. In some cases, UE 115-*b* may receive a DRX sleep indication and power down a radio based on the DRX sleep indication. The DL transmission may, for example, be an MI-DRX message associated with modifying an operation of an M-DRX configuration for the network device 105-*e* or UE 115-*b*. Operations at 440 may be performed at the UE 115-*b* by a receiver (e.g., a receiver 505 or 605 as described with reference to FIG. 5 or 6, or a transceiver 825 as described with reference to FIG. 8), and may be performed in cooperation with a UE dynamic DRX manager (e.g., a UE dynamic DRX manager 510, 610, 700, or 805 as described with reference to FIGS. 5 through 7). Additionally or alternatively, operations at 440 may be performed at the network device 105-*e* by a transmitter (e.g., a transmitter 915 or 1025 as described with reference to FIG. 9 or 10, or a transceiver 1225 as described with reference to FIG. 12), and may be performed in cooperation with a base station dynamic DRX manager (e.g., base station dynamic DRX manager 910, 1010, 1100, or 1205 as described with reference to FIGS. 9 through 12).

Figure 5:
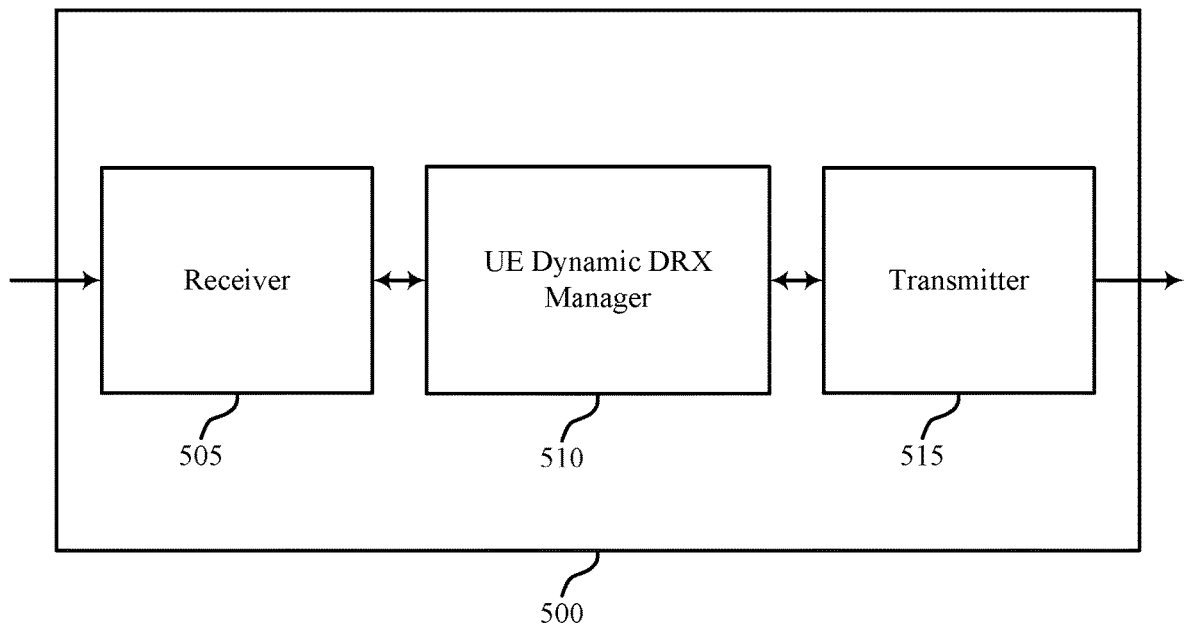
FIGS. 5 and 6 show block diagrams of wireless devices that support macro and micro DRX, in accordance with one or more aspects of the present disclosure.

FIG. 5 shows a block diagram of a wireless device 500 that supports macro and micro DRX, in accordance with one or more aspects of the present disclosure. Wireless device 500 may be an example of aspects of a UE 115 described with reference to FIGS. 1, 2 and 4. Wireless device 500 may include receiver 505, UE dynamic DRX manager 510 and transmitter 515. Wireless device 500 may also include a processor. Each of these components may be in communication with each other.

The receiver 505 may receive information such as packets, user data, or control information associated with various information channels (e.g., control channels, data channels, and information related to macro and micro DRX, etc.). Information may be passed on to other components of the device. The receiver 505 may be an example of aspects of the transceiver 825 described with reference to FIG. 8.

The UE dynamic DRX manager 510 may receive (e.g., in cooperation with the receiver 505) a DL reception indication during an active duration of a DRX configuration, identify an inactivity interval based on the DL reception indication, identify a reception opportunity following the inactivity interval based on the DL reception indication, and listen (e.g., in cooperation with the receiver 505) for a downlink transmission during the identified reception opportunity. In some examples, the downlink transmission may include a subsequent DL reception indication. The UE dynamic DRX manager 510 may be an example of aspects of the UE dynamic DRX manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
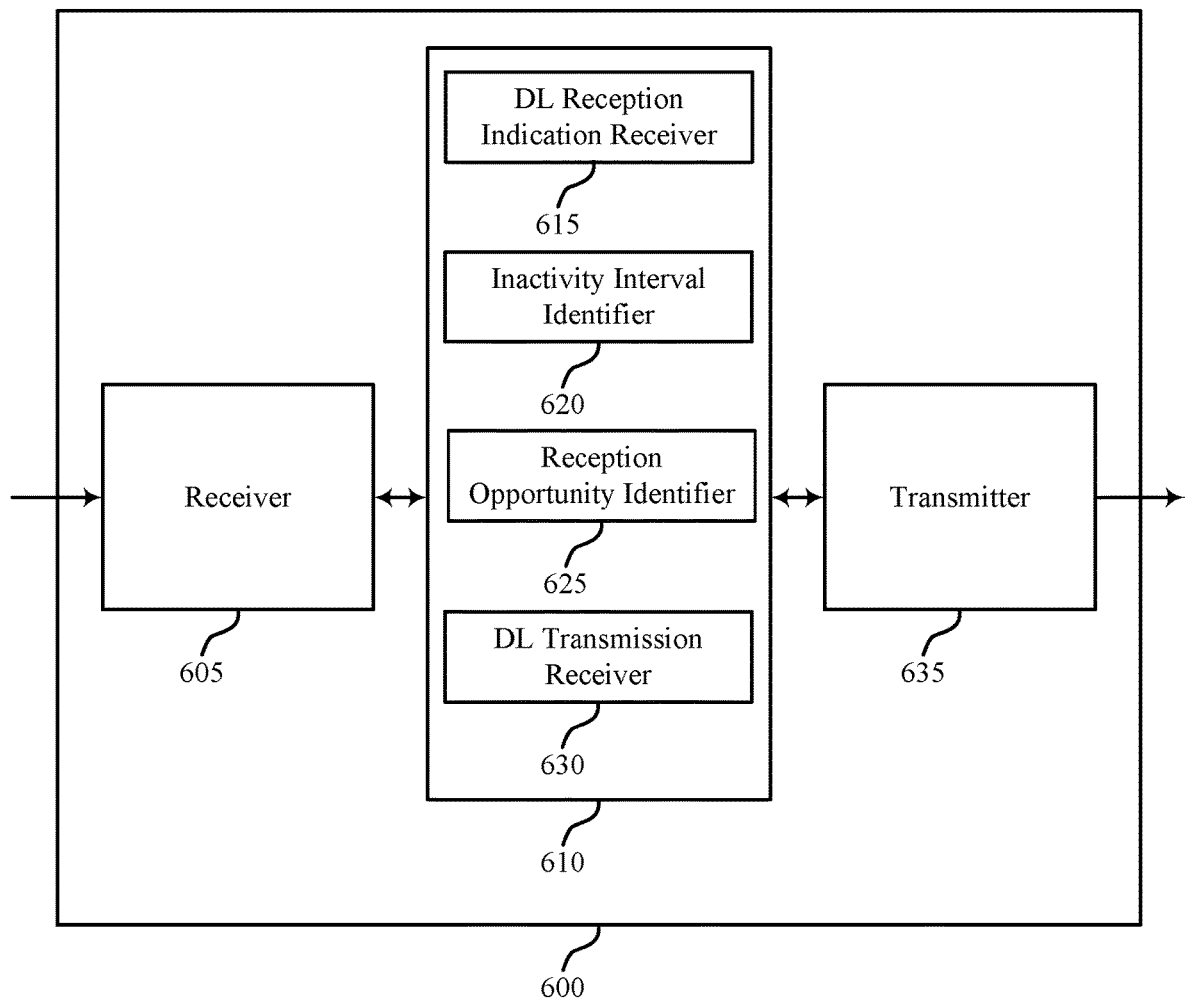

FIG. 6 shows a block diagram of a wireless device 600 that supports macro and micro DRX, in accordance with one or more aspects of the present disclosure. Wireless device 600 may be an example of aspects of a wireless device 500 or a UE 115 described with reference to FIGS. 1, 2, 4 and 5. Wireless device 600 may include receiver 605, UE dynamic DRX manager 610 and transmitter 635. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE dynamic DRX manager 610 may be an example of aspects of UE dynamic DRX manager 510 described with reference to FIG. 5. The UE dynamic DRX manager 610 may include a DL reception indication receiver 615, an inactivity interval identifier 620, a reception opportunity identifier 625, and a DL transmission receiver 630. The UE dynamic DRX manager 610 may be an example of aspects of the UE dynamic DRX manager 805 described with reference to FIG. 8.

The DL reception indication receiver 615 may receive DL reception indications (e.g., during an active duration of a DRX configuration, during the reception opportunity, etc.). In some cases, the DL reception indication may be received in cooperation with the receiver 605 using a first RAT. In some cases, the active duration may include an on duration of the DRX configuration or a previous reception opportunity.

The inactivity interval identifier 620 may identify an inactivity interval based on the DL reception indication. In some cases, a length of the inactivity interval is based on a network load, a scheduling condition, a latency tolerance, a traffic profile, or any combination thereof. In some examples, the inactivity interval identifier 620 may operate in cooperation with other portions of the wireless device 600 (e.g., the receiver 605, the DL transmission receiver, etc.) to cause the wireless device 600 to refrain from DL monitoring during the inactivity interval.

The reception opportunity identifier 625 may identify reception opportunities based on received DL reception indications. In some examples, the reception opportunity identifier 625 may operate in cooperation with other portions of the wireless device 600 (e.g., the receiver 605, the DL transmission receiver, etc.) to cause the wireless device 600 to wake from (e.g., exit) a sleep mode to monitor for downlink transmissions.

The DL transmission receiver 630 may receive DL transmissions, such as DL transmissions during identified reception opportunities. In some examples, the DL transmission receiver may listen, in cooperation with the DL reception indication receiver, for subsequent DL reception indications. In some examples, the DL transmission receiver may receive DL data from a network device 105. In various examples the DL transmission receiver may support (e.g., in cooperation with the receiver 605) configurations having different receiver power or receiver bandwidth.

The transmitter 635 may transmit signals received from other components of wireless device 600. In some examples, the transmitter 635 may be collocated with a receiver in a transceiver module. For example, the transmitter 635 may be an example of aspects of the transceiver 825 described with reference to FIG. 8. The transmitter 635 may utilize a single antenna, or it may utilize a plurality of antennas.

Figure 7:
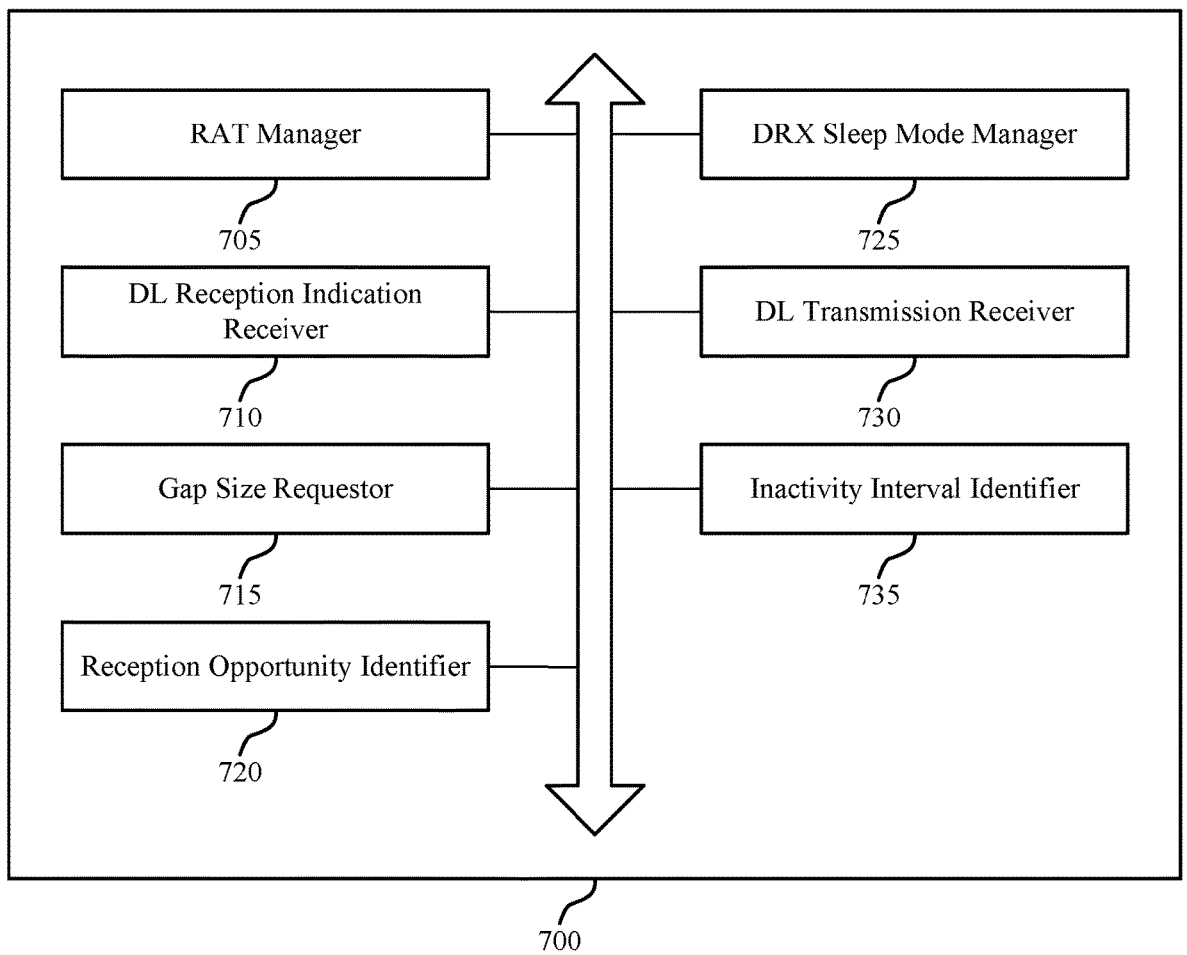
FIG. 7 shows a block diagram of a UE dynamic DRX manager that supports macro and micro DRX, in accordance with one or more aspects of the present disclosure.

FIG. 7 shows a block diagram of a UE dynamic DRX manager 700 that supports macro and micro DRX, in accordance with one or more aspects of the present disclosure. UE dynamic DRX manager 700 may be an example of the corresponding component of wireless device 500 or wireless device 600. That is, UE dynamic DRX manager 700 may be an example of aspects of UE dynamic DRX manager 510 or UE dynamic DRX manager 610 described with reference to FIGS. 5 and 6. The UE dynamic DRX manager 700 may also be an example of aspects of the UE dynamic DRX manager 805 described with reference to FIG. 8.

The UE dynamic DRX manager 700 may include RAT manager 705, DL reception indication receiver 710, gap size requestor 715, reception opportunity identifier 720, DRX sleep mode manager 725, DL transmission receiver 730, and inactivity interval identifier 735. Each of these components may communicate, directly or indirectly, with one another (e.g., via one or more buses).

The RAT manager 705 may coordinate communications (e.g., in cooperation with a transmitter and/or receiver) in different RATs during different intervals (e.g., using a first RAT to receive a DL reception indication and using a second RAT to communicate during a DRX inactivity interval, etc.).

The DL reception indication receiver 710 may receive DL reception indications (e.g., during an active duration of a DRX configuration, during the reception opportunity, etc.). In some cases, the DL reception indication may be received in cooperation with the receiver 605 using a first RAT. In some cases, the active duration may include an on duration of the DRX configuration or a previous reception opportunity.

The gap size requestor 715 may transmit (e.g., in cooperation with a transmitter) a gap size request, where a length of an identified inactivity interval may be based on the gap size request.

The reception opportunity identifier 720 may identify reception opportunities based on received DL reception indications. In some examples, the reception opportunity identifier 720 may operate in cooperation with other portions of a wireless device (e.g., a receiver, a DL transmission receiver 730, the DRX sleep mode manager, etc.) to cause a wireless device to wake from (e.g., exit) a sleep mode to monitor for downlink transmissions.

The DRX sleep mode manager 725 may manage aspects of DRX sleep modes at a wireless device. For example, the DRX sleep mode manager 725 may power down a radio (e.g., in cooperation with a transmitter or receiver, etc.) based on a DRX sleep indication, enter a sleep mode during the inactivity interval, and wake up from the sleep mode to receive DL transmissions. In some cases, the sleep mode includes a lower receiver power than a wake mode. In some examples, the DRX sleep mode manager may receive a DRX sleep indication.

The inactivity interval identifier 735 may identify an inactivity interval based on the DL reception indication. In some cases, a length of the inactivity interval is based on a network load, a scheduling condition, a latency tolerance, a traffic profile, or any combination thereof. In some examples, the inactivity interval identifier 735 may operate in cooperation with other portions of a wireless device (e.g., a receiver, a DL transmission receiver 730, a DRX sleep mode manager 725, etc.) to cause a wireless device to refrain from DL monitoring during the inactivity interval.

Figure 8:
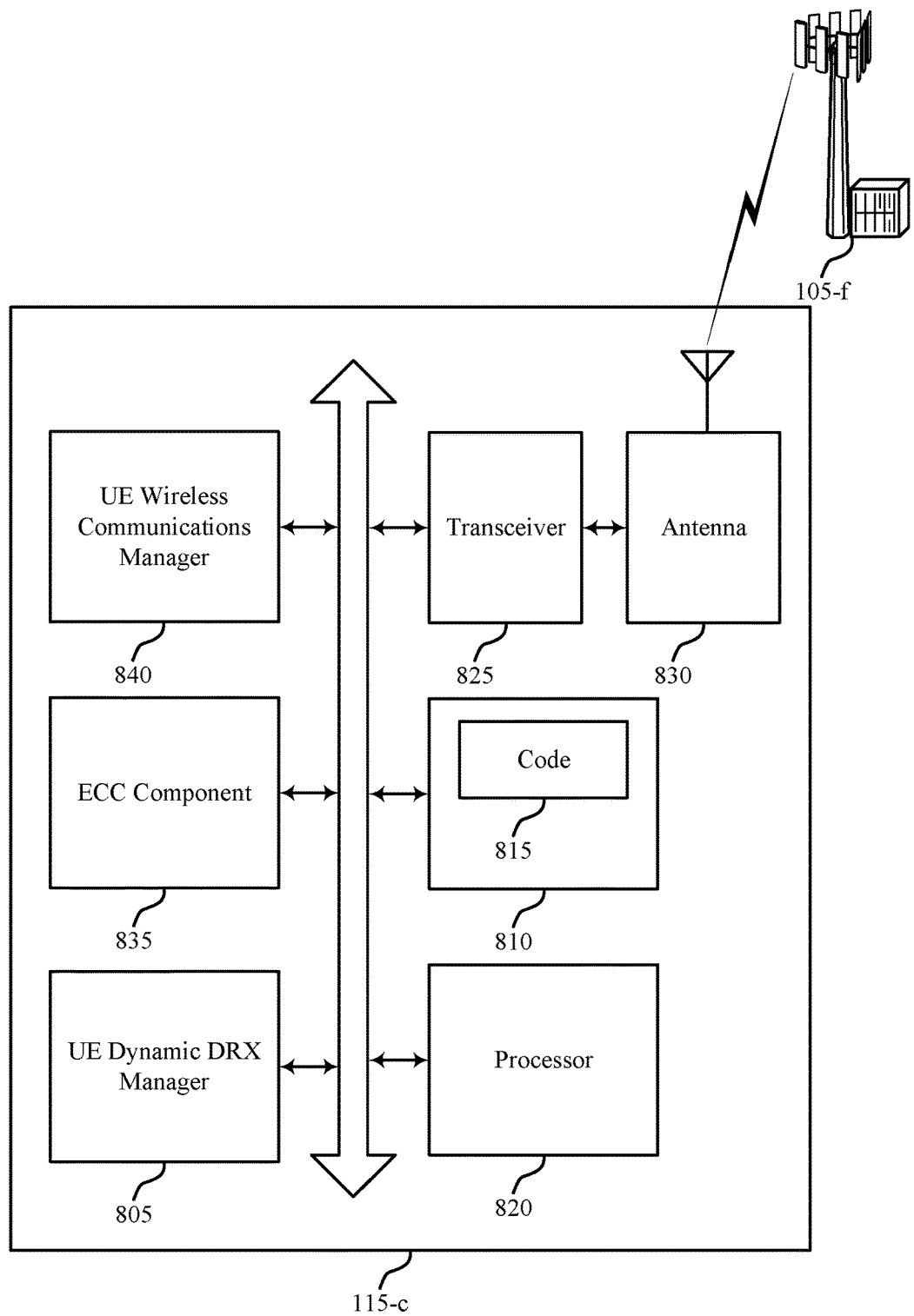
FIG. 8 illustrates a block diagram of a system including a UE that supports macro and micro DRX, in accordance with one or more aspects of the present disclosure.

FIG. 8 shows a diagram of a system 800 including a device that supports macro and micro DRX, in accordance with one or more aspects of the present disclosure. For example, system 800 may include UE 115-c, which may be an example of a wireless device 500, a wireless device 600, or a UE 115 as described with reference to FIGS. 1, 2 and 4 through 7.

UE 115-c may include UE dynamic DRX manager 805, which may be an example of aspects of UE dynamic DRX managers 510, 610, and 700 described with reference to FIGS. 5 through 7. UE 115-c may also include memory 810, processor 820, transceiver 825, antenna 830 and ECC manager 835. Each of these components may communicate, directly or indirectly, with one another (e.g., via one or more buses).

The memory 810 may include random access memory (RAM) and read only memory (ROM). The memory 810 may store computer-readable, computer-executable software/firmware code 815 including instructions that, when executed, cause the processor to perform various functions described herein (e.g., macro and micro DRX, etc.). In some cases, the code 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a network device 105-f. The transceiver 825 may also include a modem to modulate the packets and provide the modulated packets to the antennas for transmission, and to demodulate packets received from the antennas. In some cases, the wireless device may include a single antenna 830. In some cases, the device may have more than one antenna 830, which may be capable of concurrently transmitting or receiving multiple wireless transmissions.

The ECC manager 835 may enable operations using enhanced component carriers (ECCs) such as communication using shared or unlicensed spectrum, using reduced transmission time intervals (TTIs) or subframe durations, or using a large number of component carriers (CCs). The UE wireless communications manager 840 may manage one or more aspects of wireless communication with other devices (e.g., network devices 105, other UEs 115, etc.). The UE wireless communications manager 840 may, for example, perform operations that support establishing an RRC connection with a network device 105.

Figure 9:
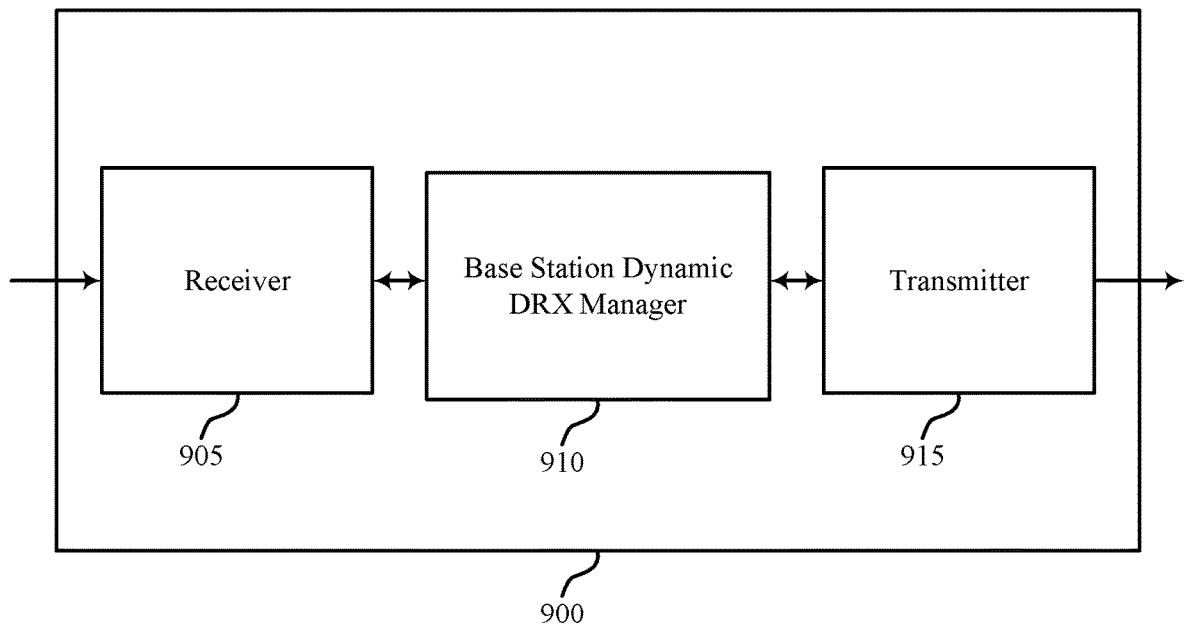
FIGS. 9 and 10 show block diagrams of wireless devices that support macro and micro DRX, in accordance with one or more aspects of the present disclosure.

FIG. 9 shows a block diagram of a wireless device 900 that supports macro and micro DRX, in accordance with one or more aspects of the present disclosure. Wireless device 900 may be an example of aspects of a network device 105 described with reference to FIGS. 1, 2 and 4 (e.g., a base station). Wireless device 900 may include receiver 905, base station dynamic DRX manager 910 and transmitter 915. Wireless device 900 may also include a processor. Each of these components may be in communication with each other.

The receiver 905 may receive information such as packets, user data, or control information associated with various information channels (e.g., control channels, data channels, and information related to macro and micro DRX, etc.). Information may be passed on to other components of the device. The receiver 905 may be an example of aspects of the transceiver 1225 described with reference to FIG. 12.

The base station dynamic DRX manager 910 may transmit (e.g., in cooperation with the transmitter 915) a first DL reception indication for a UE during an active duration of a DRX configuration, where the DL reception indication indicates a first inactivity interval and a first reception opportunity following the first inactivity interval. The base station dynamic DRX manager 910 may also transmit a second DL reception indication for the UE during the first reception opportunity. In some examples, the second DL reception indication may be associated with a different receiver power, or a different receiver bandwidth than the first DL reception indication. The base station dynamic DRX manager 910 may also be an example of aspects of the base station dynamic DRX manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
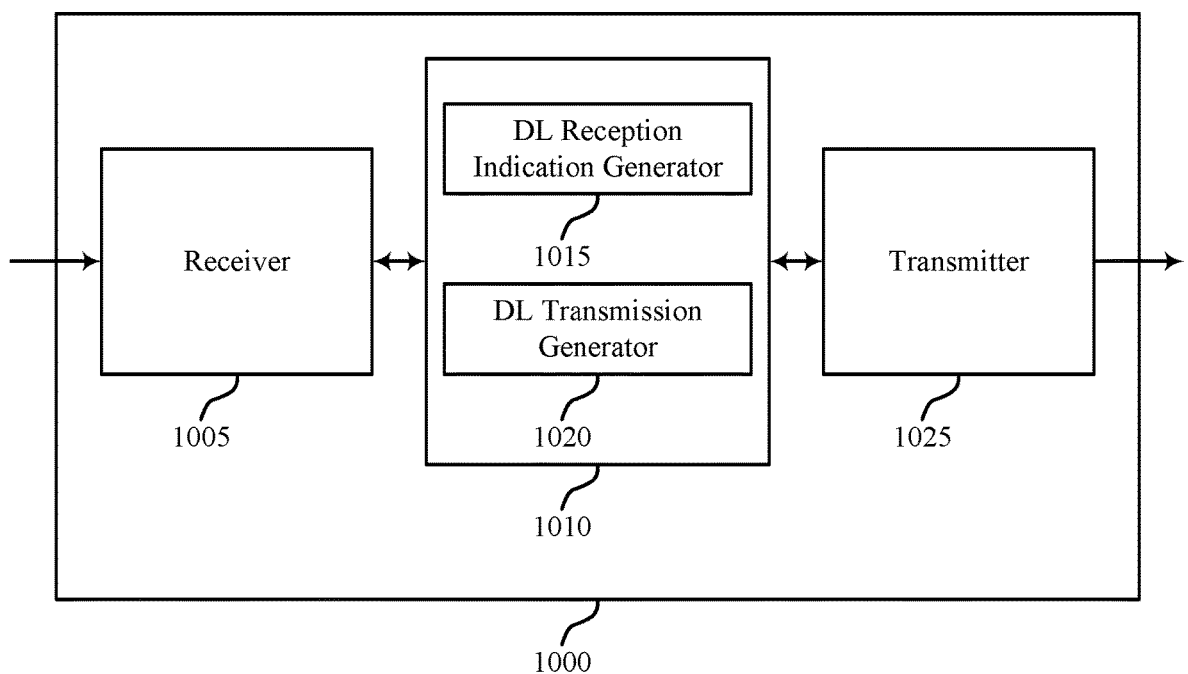

FIG. 10 shows a block diagram of a wireless device 1000 that supports macro and micro DRX, in accordance with one or more aspects of the present disclosure. Wireless device 1000 may be an example of aspects of a wireless device 900 or a network device 105 described with reference to FIGS. 1, 2, 4, and 9. Wireless device 1000 may include receiver 1005, base station dynamic DRX manager 1010 and transmitter 1025. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station dynamic DRX manager 1010 may be an example of aspects of base station dynamic DRX manager 910 described with reference to FIG. 9. The base station dynamic DRX manager 1010 may include DL reception indication generator 1015 and DL transmission generator 1020. The base station dynamic DRX manager 1010 may be an example of aspects of the base station dynamic DRX manager 1205 described with reference to FIG. 12.

The DL reception indication generator 1015 may generate and transmit (e.g., in cooperation with transmitter 1025) DL reception indication for a UE, where the DL reception indication includes an indication of an inactivity interval and/or a reception opportunity. In various examples the DL reception indication may be transmitted during an active duration of a DRX configuration, or during a reception opportunity (e.g., a DL reception opportunity that was previously indicated by the DL reception indication generator). In some cases, the DL reception indication generator may be configured to transmit DL reception indications using a configuration associated with a different receiver power or different receiver bandwidth than other DL transmissions.

The DL transmission generator 1020 may generate and transmit (e.g., in cooperation with the transmitter 1025) DL transmissions for a UE. In some examples, the DL transmission generator 1020 may be configured to support transmitting DL transmissions (e.g., DL data, DL reception indications, etc.) during receptions opportunities for a UE. In various examples the DL transmission generator may be configured to transmit DL transmissions (e.g., DL data, subsequent DL reception indications, etc.) with a configuration associated with different receiver power or different receiver bandwidth than, for example, transmission of DL reception indications.

The transmitter 1025 may transmit signals received from other components of wireless device 1000. In some examples, the transmitter 1025 may be collocated with a receiver in a transceiver module. For example, the transmitter 1025 may be an example of aspects of the transceiver 1225 described with reference to FIG. 12. The transmitter 1025 may utilize a single antenna, or it may utilize a plurality of antennas.

Figure 11:
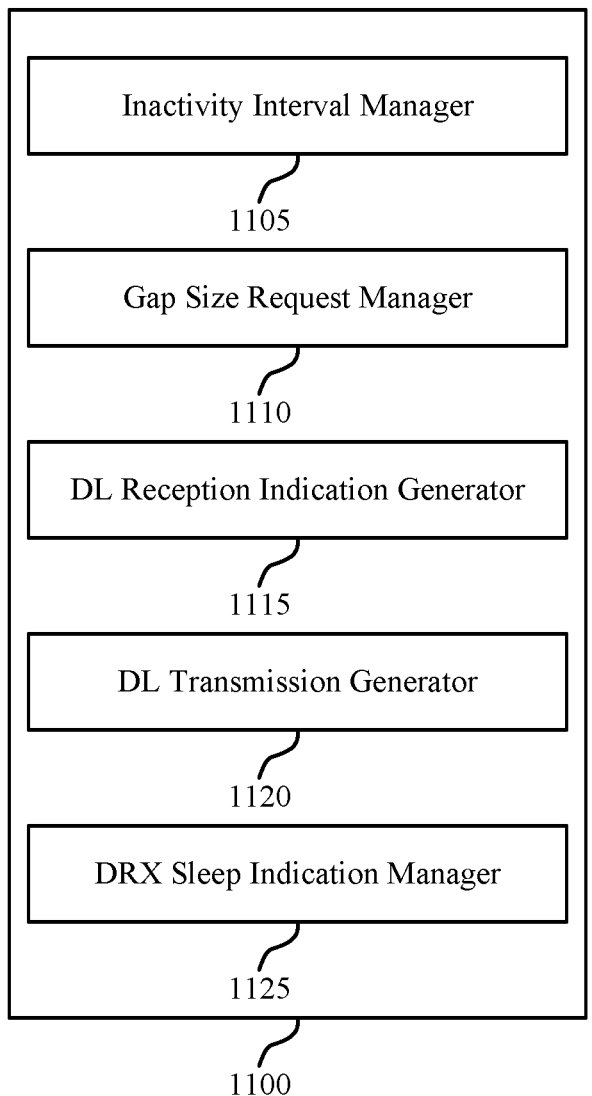
FIG. 11 shows a block diagram of a base station dynamic DRX manager that supports macro and micro DRX, in accordance with one or more aspects of the present disclosure.

FIG. 11 shows a block diagram of a base station dynamic DRX manager 1100 that supports macro and micro DRX, in accordance with one or more aspects of the present disclosure. The base station dynamic DRX manager 1100 may be an example of aspects of base station dynamic DRX manager 910 or base station dynamic DRX manager 1010 described with reference to FIGS. 9 and 10. The base station dynamic DRX manager 1100 may also be an example of aspects of the base station dynamic DRX manager 1205 described with reference to FIG. 12.

The base station dynamic DRX manager 1100 may include inactivity interval manager 1105, gap size request manager 1110, DL reception indication generator 1115, DL transmission generator 1120 and DRX sleep indication manager 1125. Each of these components may communicate, directly or indirectly, with one another (e.g., via one or more buses).

The inactivity interval manager 1105 may identify inactivity intervals for a UE. In various examples a length of an identified inactivity interval may be based on a network load, a scheduling condition, a latency tolerance, a traffic profile, or any combination thereof. In some examples, the inactivity interval manager 1105 may identify inactivity intervals for a UE such that associated reception opportunities do not overlap. In some examples, the inactivity interval manager 1105 may, in cooperation with various portions of a wireless device (e.g., a transmitter, DL reception indication generator 1115, DL transmission generator 1120, DRX sleep indication manager 1125, etc.), cause a wireless device to refrain from transmitting for a UE during an inactivity interval.

The gap size request manager 1110 may receive (e.g., in cooperation with a receiver 905 or 1005 as described with reference to FIG. 9 or 10) a gap size request from a UE, and in cooperation with the inactivity interval manager 1105. A requested gap size may be provided to the inactivity interval manager 1105, such that an inactivity interval may be identified based at least in part on the requested gap size.

The DL reception indication generator 1115 may generate and transmit (e.g., in cooperation with a transmitter 915 or 1025 described with reference to FIG. 9 or 10) a DL reception indication for a UE, where the DL reception indication includes an indication of an inactivity interval and/or a reception opportunity. In various examples the DL reception indication may be transmitted during an active duration of a DRX configuration, or during a reception opportunity (e.g., a DL reception opportunity that was previously indicated by the DL reception indication generator). In some cases, the DL reception indication generator may be configured to transmit DL reception indications using a configuration associated with a different receiver power or different receiver bandwidth than other DL transmissions The DL transmission generator 1120 may generate and transmit (e.g., in cooperation with a transmitter 915 or 1025 described with reference to FIG. 9 or 10) DL transmissions for a UE. In some examples, the DL transmission generator 1020 may be configured to support transmitting DL transmissions (e.g., DL data, DL reception indications, etc.) during receptions opportunities for a UE. In various examples the DL transmission generator may be configured to transmit DL transmissions (e.g., DL data, subsequent DL reception indications, etc.) with a configuration associated with different receiver power or different receiver bandwidth than, for example, transmission of DL reception indications.

The DRX sleep indication manager 1125 may, for example, manage aspects of generating and transmitting (e.g., in cooperation with a transmitter 915 or 1025 as described with reference to FIG. 9 or 10) DRX sleep indications for UEs to be received during identified reception opportunities.

Figure 12:
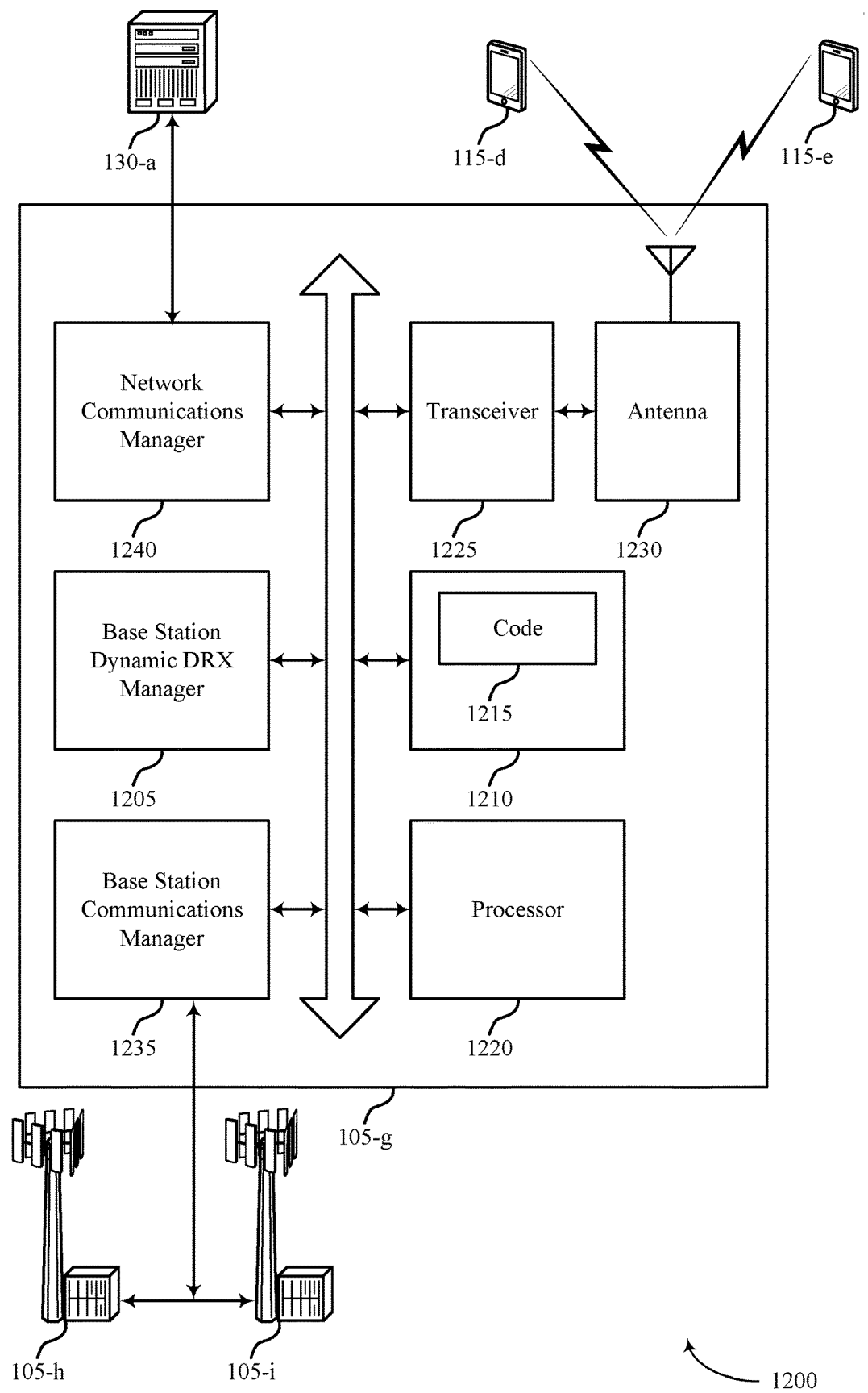
FIG. 12 illustrates a block diagram of a wireless system including a device that supports macro and micro DRX, in accordance with one or more aspects of the present disclosure.

FIG. 12 shows a diagram of a wireless system 1200 including a device that supports macro and micro DRX, in accordance with one or more aspects of the present disclosure. For example, wireless system 1200 may include network device 105-g, which may be an example of a wireless device 900, a wireless device 1000, or a network device 105 as described with reference to FIGS. 1, 2, 4 and 9 through 11. Network device 105-g may also include components for bi-directional voice and data communications including components for transmitting communications and components for receiving communications. For example, network device 105-g may communicate bi-directionally with one or more UEs 115, such as UE 115-d and UE 115-e.

Network device 105-g may include base station dynamic DRX manager 1205, which may be an example of aspects of the base station dynamic DRX managers 910, 1010, or 1100 described with reference to FIGS. 9 through 11. The network device 105-g may also include memory 1210, processor 1220, transceiver 1225, antenna 1230, base station communications manager 1235 and network communications manager 1240. Each of these components may communicate, directly or indirectly, with one another (e.g., via one or more buses).

The memory 1210 may include RAM and ROM. The memory 1210 may store computer-readable, computer-executable software/firmware code 1215 including instructions that, when executed, cause the processor to perform various functions described herein (e.g., macro and micro DRX, etc.). In some cases, the code 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a network device 105 or a UE 115. The transceiver 1225 may also include a modem to modulate the packets and provide the modulated packets to the antennas for transmission, and to demodulate packets received from the antennas. In some cases, the wireless device may include a single antenna 1230. In some cases, the device may have more than one antenna 830, which may be capable of concurrently transmitting or receiving multiple wireless transmissions.

The base station communications manager 1235 may manage communications with other network device 105 (e.g., network devices 105-h and 105-i), and may include a controller or scheduler for controlling communications with UEs 115. For example, the base station communications manager 1235 may perform operations that support establishing an RRC connection with one or more UEs 115. In some examples one or more operations performed by the base station communications manager 1235 for controlling communications with UEs 115 may be performed in cooperation with other network devices 105. For example, the base station communications manager 1235 may coordinate scheduling for transmissions to UEs 115 for various interference mitigation techniques such as beamforming or joint transmission. In some examples, base station communications manager 1235 may provide an X2 interface within a Long Term Evolution (LTE) or LTE-Advanced wireless communication network technology to provide communication between network devices 105.

The network communications manager 1240 may manage communications with the core network (e.g., core network 130-*a*) via one or more wired backhaul links. For example, the network communications manager 1240 may manage the transfer of data communications for client devices, such as one or more UEs 115.

Figure 13:
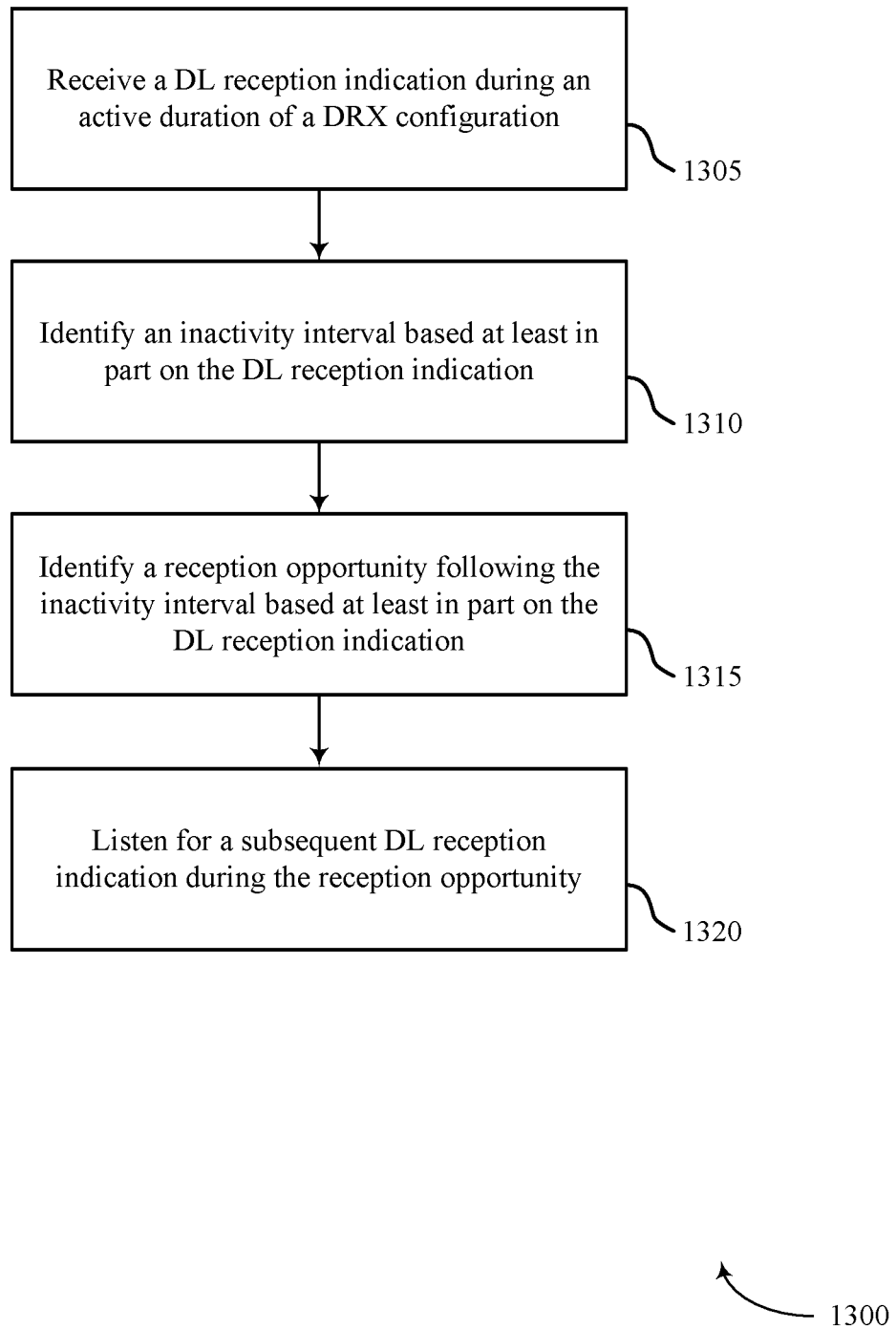
FIGS. 13 through 18 show flowcharts illustrating methods that support macro and micro DRX, in accordance with one or more aspects of the present disclosure.

FIG. 13 shows a flowchart illustrating a method 1300 that supports macro and micro DRX, in accordance with one or more aspects of the present disclosure. The operations of method 1300 may be implemented by a device such as a UE 115 or its components as described with reference to FIGS. 1, 2, 4, and 8. For example, the operations of method 1300 may be performed by a UE dynamic DRX manager, such as UE dynamic DRX managers 510, 610, 700, or 805 described with reference to FIGS. 5 through 8. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may receive a DL reception indication during an active duration of a DRX configuration, as described above with reference to FIGS. 2 through 4. In some examples, operations of block 1305 may be performed by a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

At block 1310, the UE 115 may identify an inactivity interval based at least in part on the DL reception indication, as described above with reference to FIGS. 2 through 4. In some examples, operations of block 1310 may be performed by an inactivity interval identifier 620 or 735 as described with reference to FIGS. 6 and 7.

At block 1315, the UE 115 may identify a reception opportunity following the inactivity interval based at least in part on the DL reception indication, as described above with reference to FIGS. 2 through 4. In some examples, operations of block 1315 may be performed by a reception opportunity identifier 625 or 720 as described with reference to FIGS. 6 and 7.

At block 1320, the UE 115 may listen for a subsequent DL reception indication during the reception opportunity, as described above with reference to FIGS. 2 through 4. In some examples, operations of block 1320 may be performed by a DL transmission receiver 630 or 730 or a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

Figure 14:
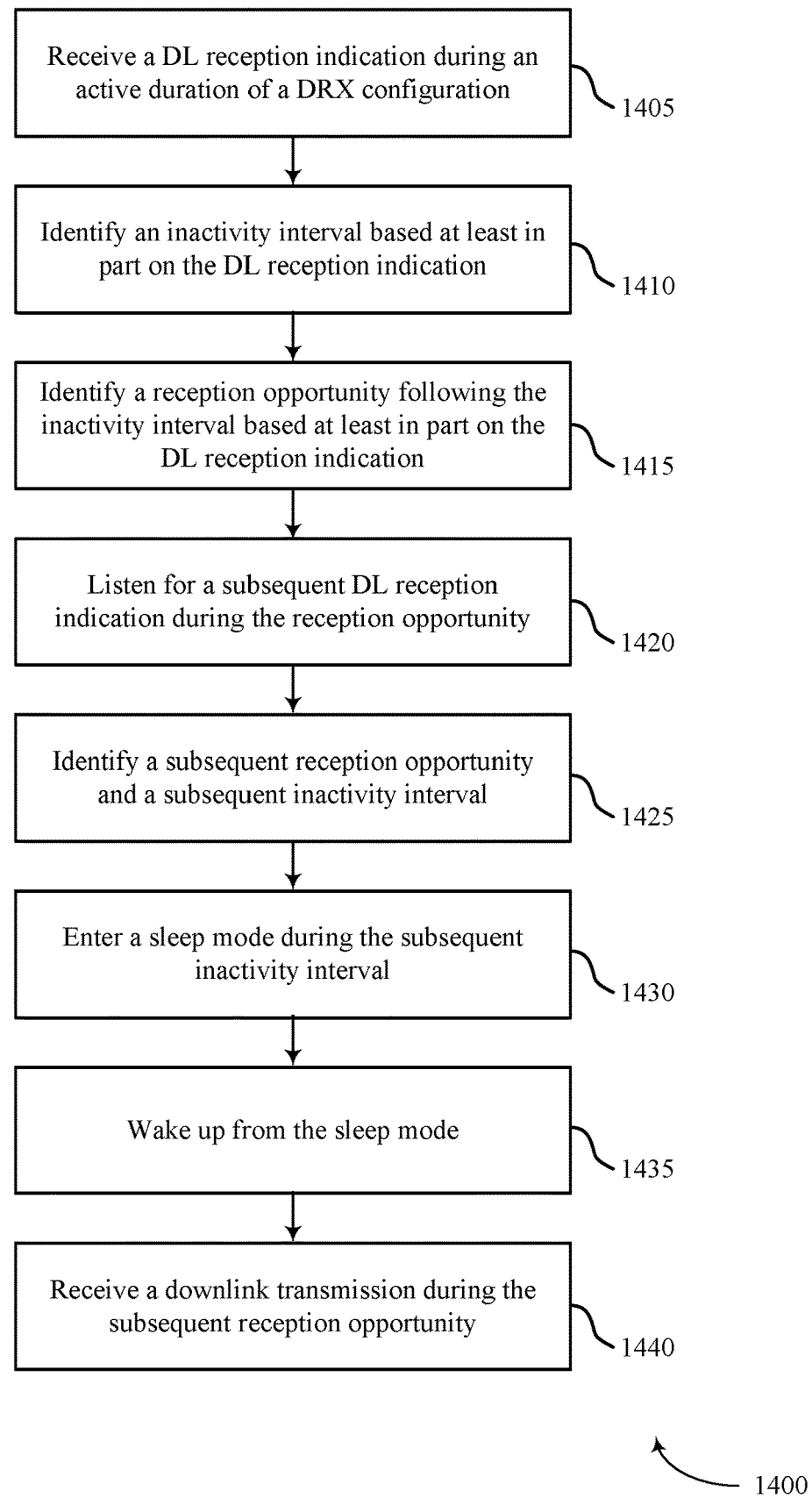

FIG. 14 shows a flowchart illustrating a method 1400 that supports macro and micro DRX, in accordance with one or more aspects of the present disclosure. The operations of method 1400 may be implemented by a device such as a UE 115 or its components as described with reference to FIGS. 1, 2, 4, and 8. For example, the operations of method 1400 may be performed by a UE dynamic DRX manager, such as UE dynamic DRX managers 510, 610, 700, or 805 as described with reference to FIGS. 5 through 8. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may receive a DL reception indication during an active duration of a DRX configuration, as described above with reference to FIGS. 2 through 4. In some examples, operations of block 1405 may be performed by a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

At block 1410, the UE 115 may identify an inactivity interval based at least in part on the DL reception indication, as described above with reference to FIGS. 2 through 4. In some examples, operations of block 1410 may be performed by an inactivity interval identifier 620 or 735 as described with reference to FIGS. 6 and 7.

At block 1415, the UE 115 may identify a reception opportunity following the inactivity interval based at least in part on the DL reception indication, as described above with reference to FIGS. 2 through 4. In some examples, operations of block 1410 may be performed by a reception opportunity identifier 625 or 720 as described with reference to FIGS. 6 and 7.

At block 1420, the UE 115 may listen for a subsequent DL reception indication during the reception opportunity, as described above with reference to FIGS. 2 through 4. In some examples, operations of block 1420 may be performed by a DL reception indication receiver 615 or 710 as described with reference to FIG. 6 or 7, which may perform in cooperation with a receiver 505 or 605 as described with reference to FIG. 5 or 6, or a transceiver 825 as described with reference to FIG. 8.

At block 1425, the UE 115 may identify a subsequent reception opportunity and a subsequent inactivity interval based at least in part on listening for the subsequent DL reception indication, as described above with reference to FIGS. 2 through 4. In some examples, operations of block 1425 may be performed by DL transmission receiver 630 or 730 or a reception opportunity identifier 625 or 720 as described with reference to FIG. 6 or 7.

At block 1430, the UE 115 may enter a sleep mode during the subsequent inactivity interval, as described above with reference to FIGS. 2 through 4. In some examples, operations of block 1430 may be performed by a DRX sleep mode manager 725 as described with reference to FIG. 7.

At block 1435, the UE 115 may wake up from the sleep mode to receive the data as described above with reference to FIGS. 2 through 4. In some examples, operations of block 1435 may be performed by a DRX sleep mode manager 725 as described with reference to FIGS. 6 and 7.

At block 1440, the UE 115 may receive a downlink transmission (e.g., DL data, another DL reception indication, etc.) during the subsequent reception opportunity, as described above with reference to FIGS. 2 through 4. In some examples, operations of block 1440 may be performed by a DL transmission receiver 630 or 730 as described with reference to FIGS. 6 and 7, which may perform in cooperation with a receiver 505 or 605 as described with reference to FIG. 5 or 6, or a transceiver 825 as described with reference to FIG. 8.

Figure 15:
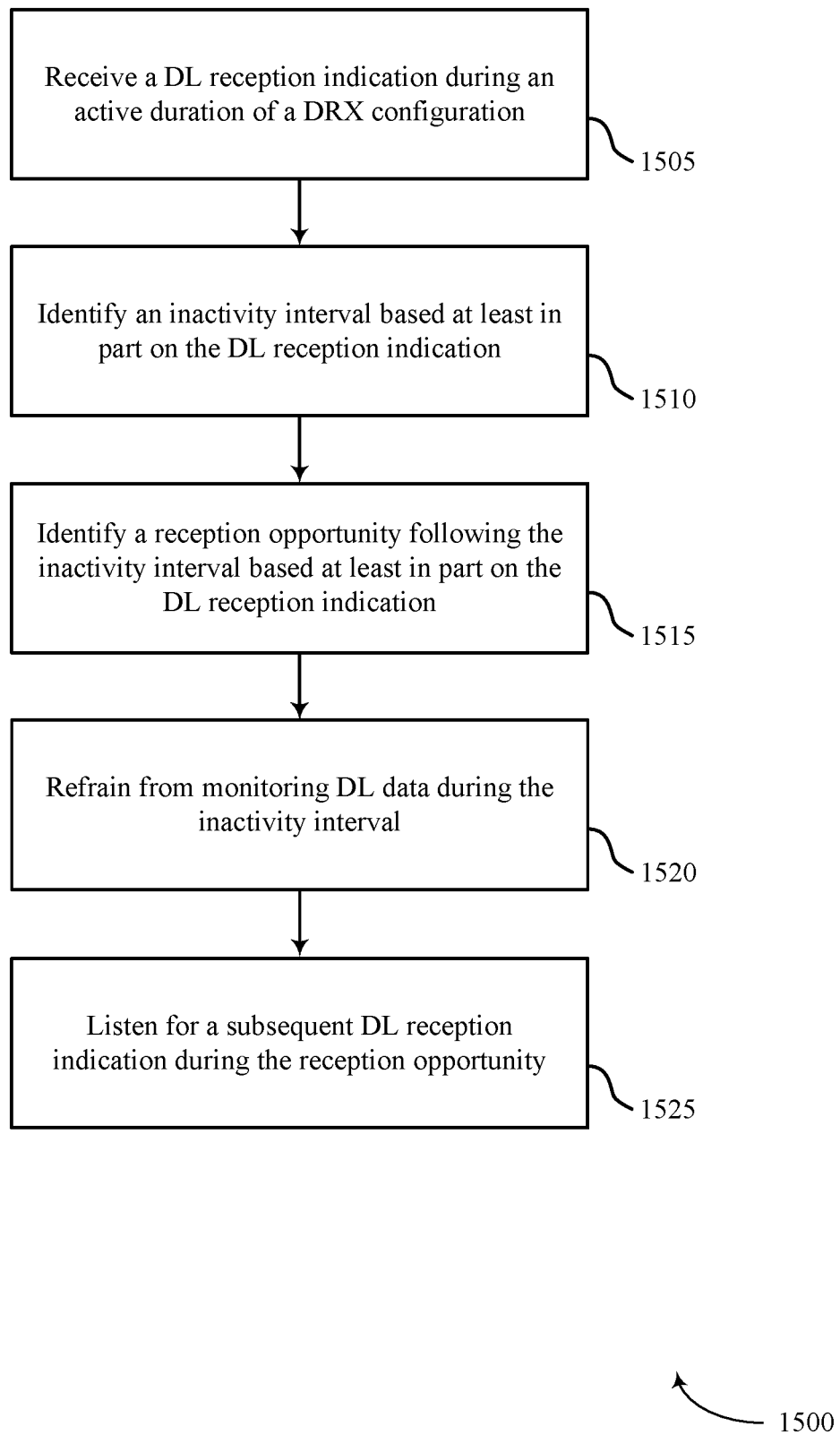

FIG. 15 shows a flowchart illustrating a method 1500 that supports macro and micro DRX, in accordance with one or more aspects of the present disclosure. The operations of method 1500 may be implemented by a device such as a UE 115 or its components as described with reference to FIGS. 1, 2, 4, and 8. For example, the operations of method 1500 may be performed by a UE dynamic DRX manager, such as UE dynamic DRX managers 510, 610, 700, or 805 described with reference to FIGS. 5 through 8. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive a DL reception indication during an active duration of a DRX configuration, as described above with reference to FIGS. 2 through 4. In some examples, operations of block 1505 may be performed by a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

At block 1510, the UE 115 may identify an inactivity interval based at least in part on the DL reception indication, as described above with reference to FIGS. 2 through 4. In some examples, operations of block 1510 may be performed by an inactivity interval identifier 620 or 735 as described with reference to FIGS. 6 and 7.

At block 1515, the UE 115 may identify a reception opportunity following the inactivity interval based at least in part on the DL reception indication, as described above with reference to FIGS. 2 through 4. In some examples, operations of block 1515 may be performed by a reception opportunity identifier 625 or 720 as described with reference to FIGS. 6 and 7.

At block 1520, the UE 115 may refrain from monitoring DL data during the inactivity interval, as described above with reference to FIGS. 2 through 4. In some examples, operations of block 1520 may be performed by a DL transmission receiver 630 or 730 or an inactivity interval identifier 620 or 735 as described with reference to FIGS. 6 and 7.

At block 1525, the UE 115 may listen for a subsequent DL reception indication during the reception opportunity, as described above with reference to FIGS. 2 through 4. In some examples, operations of block 1525 may be performed by a DL transmission receiver 630 or 730 or a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

Figure 16:
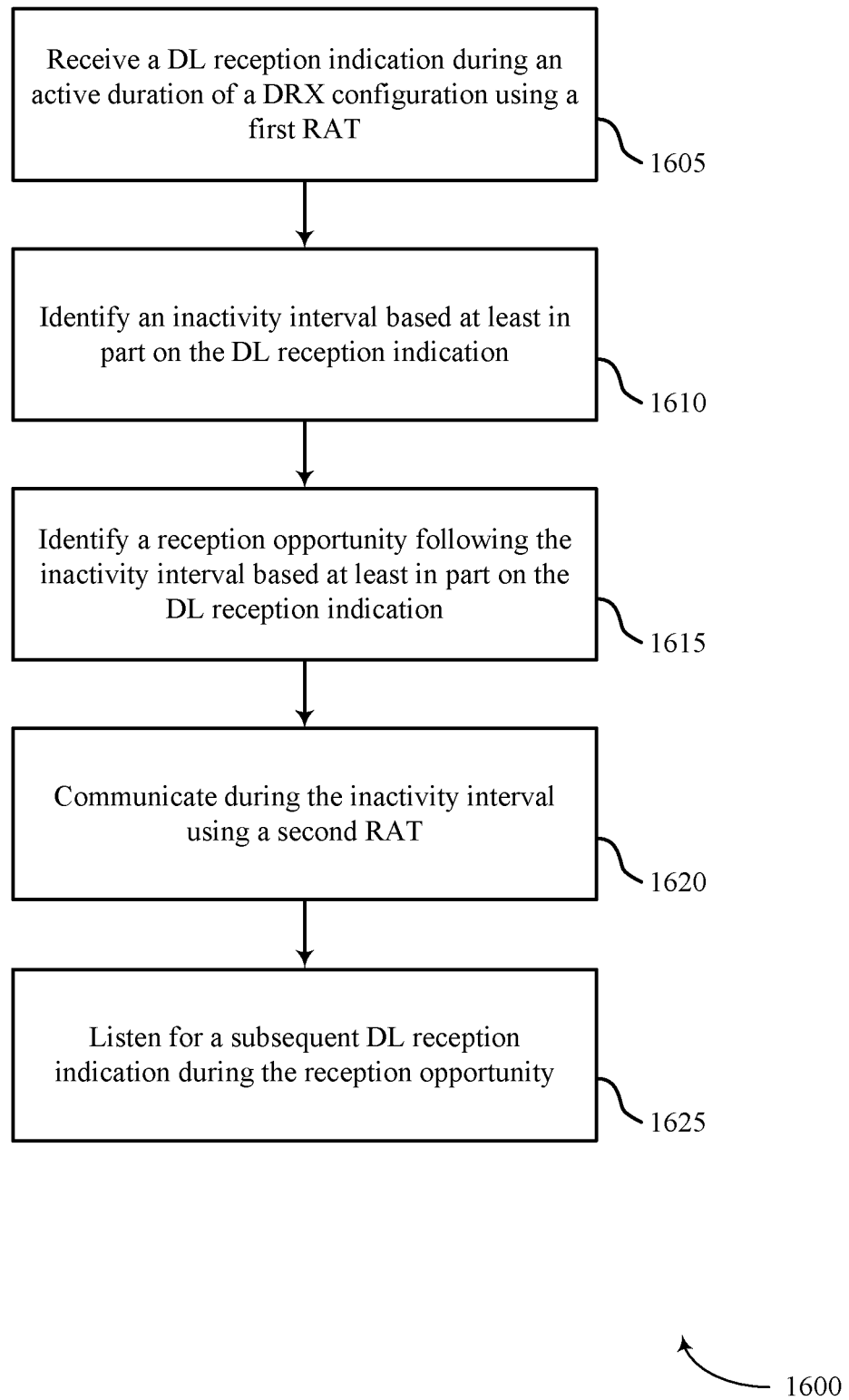

FIG. 16 shows a flowchart illustrating a method 1600 that supports macro and micro DRX, in accordance with one or more aspects of the present disclosure. The operations of method 1600 may be implemented by a device such as a UE 115 or its components as described with reference to FIGS. 1, 2, 4, and 8. For example, the operations of method 1600 may be performed by a UE dynamic DRX manager, such as UE dynamic DRX managers 510, 610, 700, or 805 described with reference to FIGS. 5 through 8. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may receive a DL reception indication during an active duration of a DRX configuration using a first RAT, as described above with reference to FIGS. 2 through 4. In some examples, operations of block 1605 may be performed by a DL reception indication receiver 615 or 710 or a RAT manager 705 as described with reference to FIGS. 6 and 7, which may perform in cooperation with a receiver 505 or 605 as described with reference to FIG. 5 or 6, or a transceiver 825 as described with reference to FIG. 8.

At block 1610, the UE 115 may identify an inactivity interval based at least in part on the DL reception indication, as described above with reference to FIGS. 2 through 4. In some examples, operations of block 1610 may be performed by an inactivity interval identifier 620 or 735 as described with reference to FIGS. 6 and 7.

At block 1615, the UE 115 may identify a reception opportunity following the inactivity interval based at least in part on the DL reception indication, as described above with reference to FIGS. 2 through 4. In some examples, operations of block 1615 may be performed by a reception opportunity identifier 625 or 720 as described with reference to FIGS. 6 and 7.

At block 1620, the UE 115 may communicate during the inactivity interval using a second RAT, as described above with reference to FIGS. 2 through 4. In some examples, operations of block 1620 may be performed by a RAT manager 705 as described with reference to FIGS. 6 and 7, which may perform in cooperation with a receiver 505 or 605 or transmitter 515 or 635 as described with reference to FIG. 5 or 6, or a transceiver 825 as described with reference to FIG. 8.

At block 1625, the UE 115 may listen for a subsequent DL reception indication during the reception opportunity, as described above with reference to FIGS. 2 through 4. In some examples, operations of block 1625 may be performed by a DL transmission receiver 630 or 730 or a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

Figure 17:
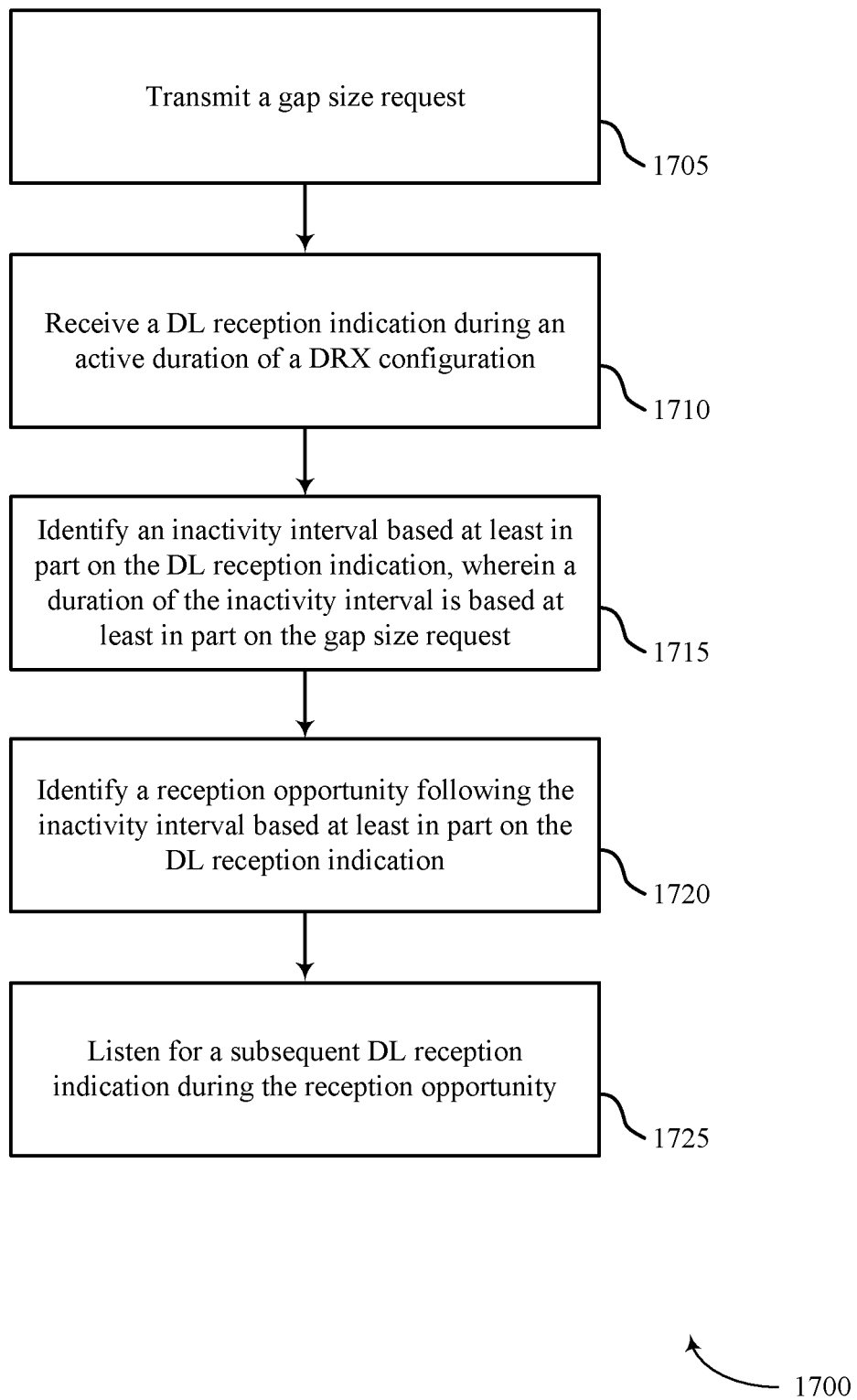

FIG. 17 shows a flowchart illustrating a method 1700 that supports macro and micro DRX, in accordance with one or more aspects of the present disclosure. The operations of method 1700 may be implemented by a device such as a UE 115 or its components as described with reference to FIGS. 1, 2, 4, and 8. For example, the operations of method 1700 may be performed by a UE dynamic DRX manager, such as UE dynamic DRX managers 510, 610, 700, or 805 described with reference to FIGS. 5 through 8. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may transmit a gap size request, as described above with reference to FIGS. 2 through 4. In some examples, operations of block 1705 may be performed by a gap size requestor 715 as described with reference to FIG. 7, which may perform in cooperation with a transmitter 515 or 635 as described with reference to FIG. 5 or 6, or a transceiver 825 as described with reference to FIG. 8.

At block 1710, the UE 115 may receive a DL reception indication during an active duration of a DRX configuration, as described above with reference to FIGS. 2 through 4. In some examples, operations of block 1710 may be performed by a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

At block 1715, the UE 115 may identify an inactivity interval based at least in part on the DL reception indication, wherein a duration of the inactivity interval is based at least in part on the gap size request, as described above with reference to FIGS. 2 through 4. In some examples, operations of block 1715 may be performed by an inactivity interval identifier 620 or 735 as described with reference to FIGS. 6 and 7.

At block 1720, the UE 115 may identify a reception opportunity following the inactivity interval based at least in part on the DL reception indication, as described above with reference to FIGS. 2 through 4. In some examples, operations of block 1720 may be performed by a reception opportunity identifier 625 or 720 as described with reference to FIGS. 6 and 7.

At block 1725, the UE 115 may listen for a subsequent DL reception indication during the reception opportunity, as described above with reference to FIGS. 2 through 4. In some examples, operations of block 1725 may be performed by a DL transmission receiver 630 or 730 or a DL reception indication receiver 615 or 710 as described with reference to FIGS. 6 and 7, which may perform in cooperation with a receiver 505 or 605 as described with reference to FIG. 5 or 6, or a transceiver 825 as described with reference to FIG. 8.

Figure 18:
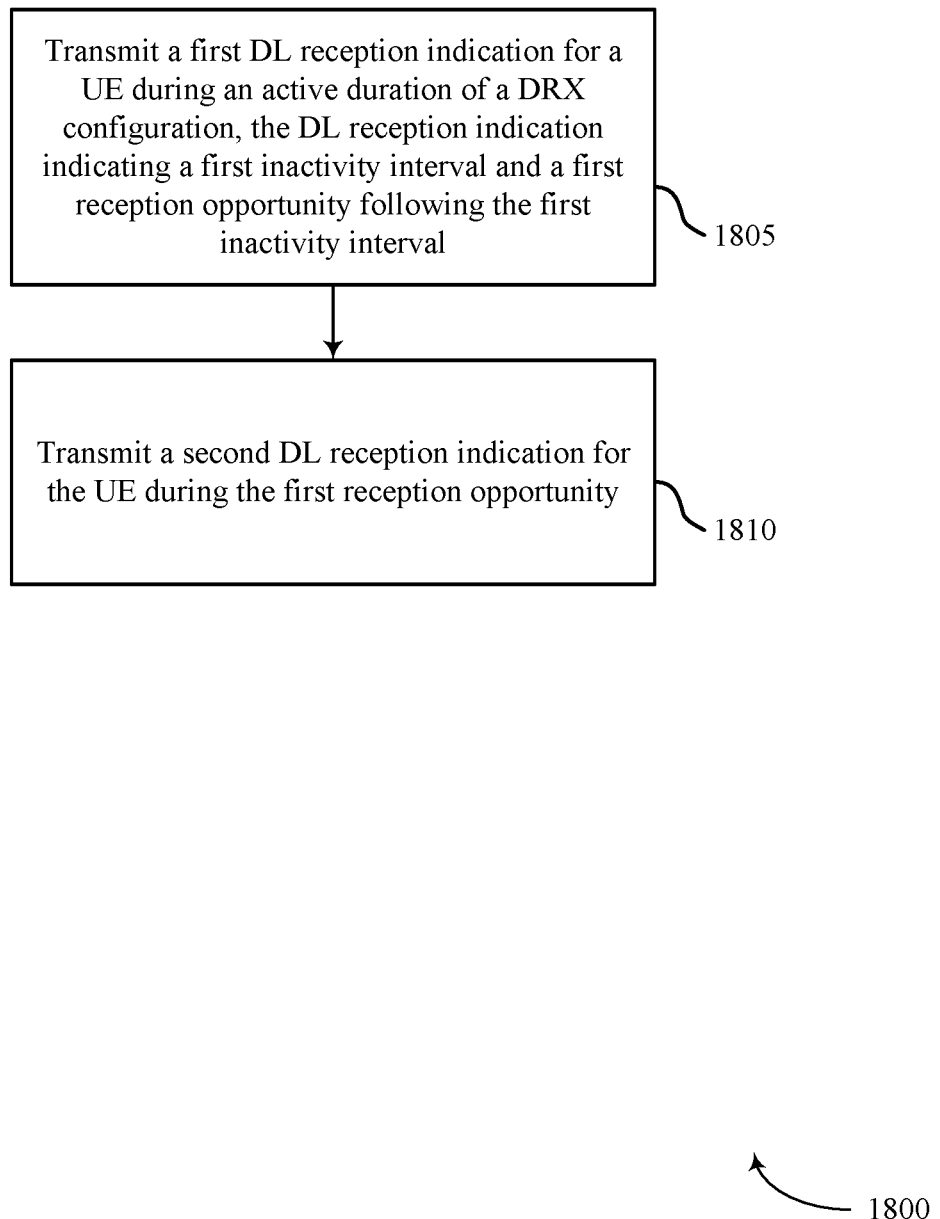

FIG. 18 shows a flowchart illustrating a method 1800 that supports macro and micro DRX, in accordance with one or more aspects of the present disclosure. The operations of method 1800 may be implemented by a device such as a network device 105 or its components as described with reference to FIGS. 1, 2, 4, and 12. For example, the operations of method 1800 may be performed by a base station dynamic DRX manager, such as base station dynamic DRX managers 910, 1010, 1100, or 1205 described with reference to FIGS. 9-12. In some examples, the network device 105 may execute a set of codes to control the functional elements of the device to perform the functions described below. Additionally or alternatively, the network device 105 may perform aspects of the functions described below using special-purpose hardware.

At block 1805, the network device 105 may transmit a first DL reception indication for a UE during an active duration of a DRX configuration, the DL reception indication indicating a first inactivity interval and a first reception opportunity following the first inactivity interval, as described above with reference to FIGS. 2 through 4. In some examples, operations of block 1805 may be performed by a DL reception indication generator 1015 or 1115 as described with reference to FIGS. 10 and 11, which may perform in cooperation with a transmitter 915 or 1025 as described with reference to FIG. 9 or 10, or a transceiver 1225 as described with reference to FIG. 12.

At block 1810, the network device 105 may transmit a second DL reception indication for the UE during the first reception opportunity, as described above with reference to FIGS. 2 through 4. In various examples the second DL reception indication may indicate a second inactivity interval or a second reception opportunity, and may be associated with a different receiver power or a different receiver bandwidth than the first DL reception indication. In some examples, operations of block 1810 may be performed by the DL transmission generator as described with reference to FIGS. 10 and 11, which may perform in cooperation with a transmitter 915 or 1025 as described with reference to FIG. 9 or 10, or a transceiver 1225 as described with reference to FIG. 12.

It should be noted that these methods describe possible implementation, and that the operations may be rearranged or otherwise modified such that other implementations are possible. In some examples, aspects from two or more of the methods may be combined. For example, aspects of each of the methods may include operations or aspects of the other methods, or other operations or techniques described herein. Thus, aspects of the disclosure may provide methods, systems, and apparatuses that support macro and micro DRX.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

As used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP Long Term Evolution (LTE) and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communication system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide that supports macro and micro DRX. It should be noted that these methods describe possible implementations, and that the operations and the operations may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. An apparatus for wireless communication, comprising:
one or more processors; and
memory coupled with the one or more processors and storing instructions executable by the one or more processors to cause the apparatus to:
receive, at a user equipment (UE) during an on duration of a discontinuous reception (DRX) configuration established at the UE, a downlink (DL) reception indication that identifies an inactivity interval;
identify, at the UE based at least in part on the DL reception indication, a reception opportunity that follows the inactivity interval, wherein the reception opportunity is different than the on duration of the DRX configuration; and
monitor, by the UE, for a physical downlink control channel (PDCCH) during the reception opportunity.

2. The apparatus of claim 1, wherein the instructions are further executable by the one or more processors to cause the apparatus to:
receive the DL reception indication in a second PDCCH during the on duration of the DRX configuration.

3. The apparatus of claim 1, wherein:
the on duration of the DRX configuration is associated with a periodic duration of the DRX configuration; and
the reception opportunity is different than the periodic duration of the DRX configuration.

4. The apparatus of claim 1, wherein the DL reception indication identifies a zero length inactivity interval.

5. The apparatus of claim 1, wherein the instructions are further executable by the one or more processors to cause the apparatus to:
establish a radio resource control (RRC) connection with a network device, wherein the DRX configuration is established based at least in part on the establishment of the RRC connection with the network device.

6. An apparatus for wireless communication, comprising:
one or more processors; and
memory coupled with the one or more processors and storing instructions executable by the one or more processors to cause the apparatus to:
transmit, by a network device during an on duration of a discontinuous reception (DRX) configuration established with a user equipment (UE), a downlink (DL) reception indication to the UE that identifies an inactivity interval; and
transmit, by the network device based at least in part on the transmission of the DL reception indication, a physical downlink control channel (PDCCH) to the UE during a reception opportunity of the UE that follows the inactivity interval, wherein the reception opportunity is different than the on duration of the DRX configuration.

7. The apparatus of claim 6, wherein the instructions are further executable by the one or more processors to cause the apparatus to:
transmit the DL reception indication in a second PDCCH during the on duration of the DRX configuration.

8. The apparatus of claim 6, wherein:
the on duration of the DRX configuration is associated with a periodic duration of the DRX configuration; and
the reception opportunity is different than the periodic duration of the DRX configuration.

9. The apparatus of claim 6, wherein the DL reception indication identifies a zero length inactivity interval.

10. The apparatus of claim 6, wherein the instructions are further executable by the one or more processors to cause the apparatus to:
establish a radio resource control (RRC) connection with the UE, wherein the DRX configuration is established based at least in part on the establishment of the RRC connection with the UE.

11. A method of wireless communication, comprising:
receiving, at a user equipment (UE) during an on duration of a discontinuous reception (DRX) configuration established at the UE, a downlink (DL) reception indication that identifies an inactivity interval;
identifying, at the UE based at least in part on the DL reception indication, a reception opportunity that follows the inactivity interval, wherein the reception opportunity is different than the on duration of the DRX configuration; and
monitoring, by the UE, for a physical downlink control channel (PDCCH) during the reception opportunity.

12. The method of claim 11, the receiving comprising:
receiving the DL reception indication in a second PDCCH during the on duration of the DRX configuration.

13. The method of claim 11, wherein:
the on duration of the DRX configuration is associated with a periodic duration of the DRX configuration; and
the reception opportunity is different than the periodic duration of the DRX configuration.

14. The method of claim 11, wherein the DL reception indication identifies a zero length inactivity interval.

15. The method of claim 11, further comprising:
establishing a radio resource control (RRC) connection with a network device, wherein the DRX configuration is established based at least in part on establishing the RRC connection with the network device.

16. A method of wireless communication, comprising:
- transmitting, by a network device during an on duration of a discontinuous reception (DRX) configuration established with a user equipment (UE), a downlink (DL) reception indication to the UE that identifies an inactivity interval; and
- transmitting, by the network device based at least in part on transmitting the DL reception indication, a physical downlink control channel (PDCCH) to the UE during a reception opportunity of the UE that follows the inactivity interval, wherein the reception opportunity is different than the on duration of the DRX configuration.

17. The method of claim 16, the transmitting the DL reception indication comprising:
- transmitting the DL reception indication in a second PDCCH during the on duration of the DRX configuration.

18. The method of claim 16, wherein:
- the on duration of the DRX configuration is associated with a periodic duration of the DRX configuration; and
- the reception opportunity is different than the periodic duration of the DRX configuration.

19. The method of claim 16, wherein the DL reception indication identifies a zero length inactivity interval.

20. The method of claim 16, further comprising:
- establishing a radio resource control (RRC) connection with the UE, wherein the DRX configuration is established based at least in part on establishing the RRC connection with the UE.

* * * * *